(12) United States Patent
Yoshida et al.

(10) Patent No.: US 6,711,351 B2
(45) Date of Patent: Mar. 23, 2004

(54) CAMERA

(75) Inventors: Hideo Yoshida, Saitama (JP); Yoshikazu Mihara, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/179,197

(22) Filed: Jun. 26, 2002

(65) Prior Publication Data

US 2003/0001961 A1 Jan. 2, 2003

(30) Foreign Application Priority Data

Jun. 29, 2001 (JP) .................................... 2001-199856
Jan. 30, 2002 (JP) .................................... 2002-021502

(51) Int. Cl.[7] .............................................. G03B 15/02
(52) U.S. Cl. ......................................... 396/106; 396/108
(58) Field of Search ................................. 396/106, 108; 348/345

(56) References Cited

FOREIGN PATENT DOCUMENTS

| JP | 55015154 A | 2/1980 |
|----|------------|--------|
| JP | 59201009 A | 11/1984 |
| JP | 05034577 A | 2/1993 |
| JP | 2000111791 A | 4/2000 |
| JP | 3139067 | 12/2000 |
| JP | 2000338386 A | 12/2000 |

Primary Examiner—Russell Adams
Assistant Examiner—Arthur A Smith
(74) Attorney, Agent, or Firm—Harness, Dickey & Pierce, P.L.C.

(57) ABSTRACT

Where a subject is dark, half pressing of a shutter release button causes an auxiliary light for auto-focusing use to be emitted from an electric flash. If half pressing and cancellation take place consecutively, a power of a main capacitor for the electric flash will become in sufficient, it is charged after emission of an auxiliary light. A camera is to be provided which can prevent charge processing from deteriorating an operating convenience by limiting either a duration of charging or a charging voltage then. Where the subject is dark, half pressing of the shutter release button causes the electric flash to emit an auxiliary light (AF pre-emission) and auto-focusing control to be executed. If half pressing of the shutter release button and its cancellation take place consecutively, charging of the main capacitor of the electric flash is performed alternately for different lengths of time, 150 ms and 300 ms.

5 Claims, 18 Drawing Sheets

FIG.7(A)
FIG.7(B)
FIG.7(C)
FIG.7(D)
FIG.7(E)
FIG.7(F)
FIG.7(G)
FIG.7(H)

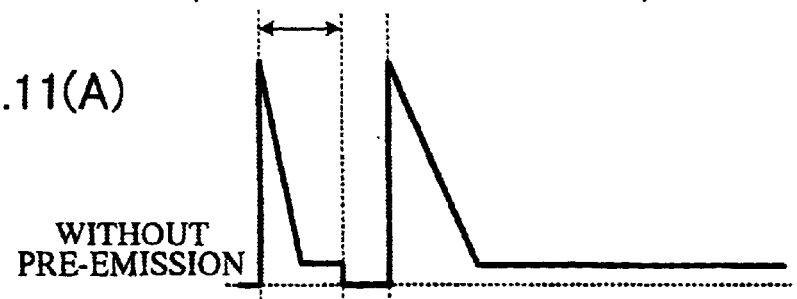
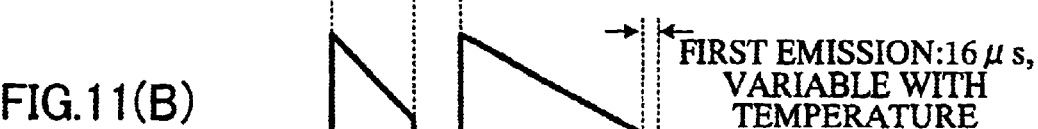

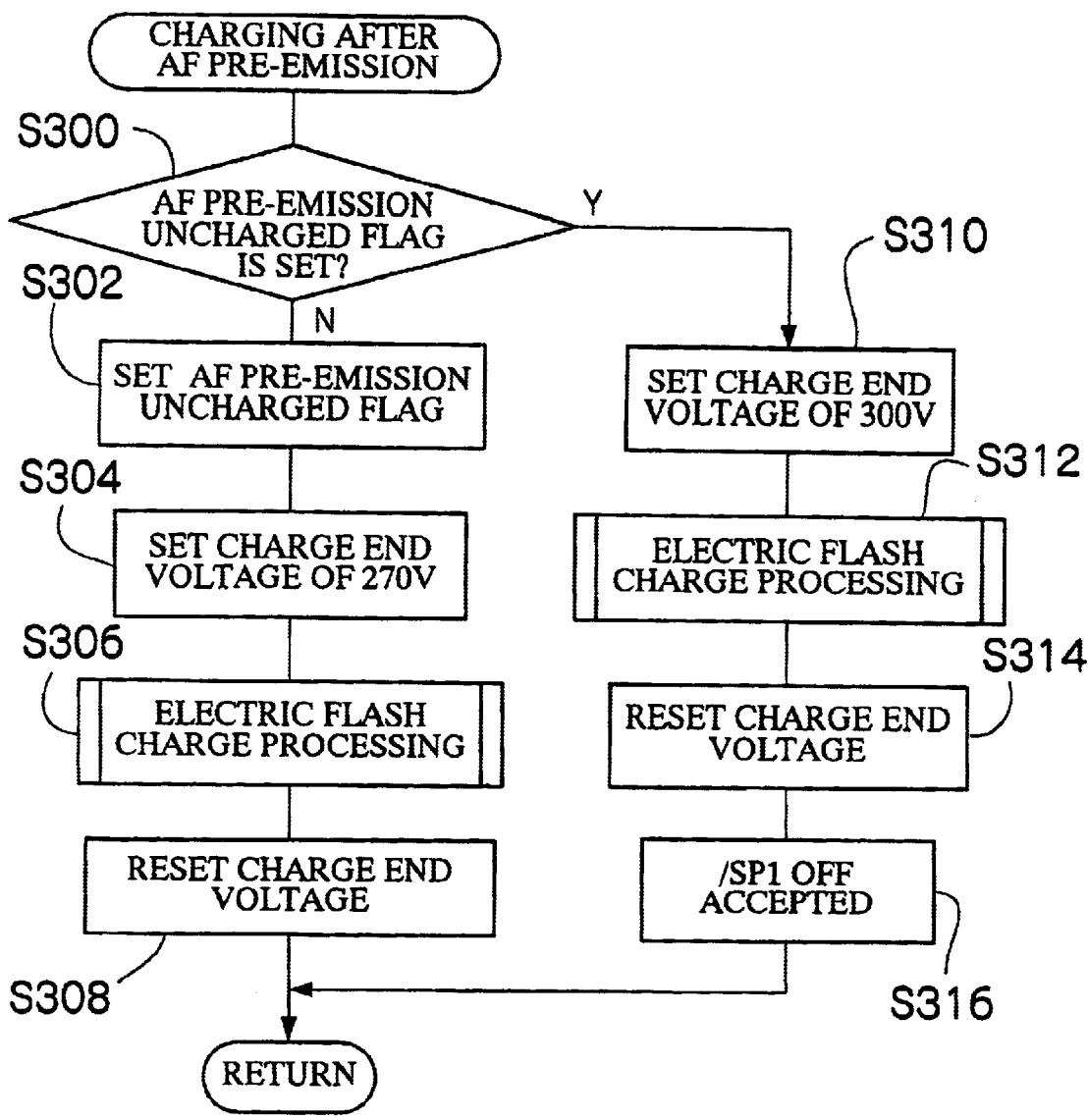

CAMERA

BACKGROUND OF THE INVENTION

1. Field of the Invention

The present invention relates to a camera, and more particularly to a camera which performs auto-focusing control by a passive system.

2. Description of the Related Art

For cameras which perform auto-focusing control in range finding, focus determination and the like by a passive system, what is provided with a device for emitting an auxiliary light for auto-focusing use is proposed because insufficient luminance of the subject prevents auto-focusing control from appropriately functioning. Also is proposed such a device using an electric flash as the source of the auxiliary light (Japanese Patent Application Publication Nos. 55-15154, 59-201009, 2000-111791 and 2000-338386, Japanese Patent No. 3139067 and so forth).

While an auxiliary light for auto-focusing use is emitted when, for instance, focusing is done by half pressing the shutter release button, where an electric flash is used for emitting this auxiliary light, if half pressing of the shutter release button and its cancellation are repeated, the electric power needed for real light emission for releasing the shutter may become insufficient. For this reason, it is necessary to charge the main capacitor after emitting an auxiliary light, but if the main capacitor is fully charged every time, when the shutter release button is fully pressed in the charging period, a longer time will be taken before the shutter can be released. Thus, since the shutter cannot be released during the charging period, even if the shutter release button is fully pressed, the user will have to wait until the charging is completed. The user will therefore feel awkward, and the camera itself will suffer the disadvantage of operating inconvenience.

SUMMARY OF THE INVENTION

An object of the present invention, attempted in view of this circumstance, is to provide a camera capable of charging the main capacitor after the emission of an auxiliary light for auto-focusing use with minimum operating inconvenience.

In order to attain the object stated above, the present invention is directed to a camera, comprising: a sensor having a plurality of light receiving elements which receive light from a subject in a range-finding area; an auto-focusing controller which performs auto-focusing control according to an output of the sensor; a charging device which charges a main capacitor; a light emitting device which is supplied with electric energy by the main capacitor and emits auxiliary light for auto-focusing use and auxiliary light for exposure use to the subject; a shutter release button which, when half pressed, causes auto-focusing control to be started according to the output of the sensor and, when fully pressed, causes shooting to be started; a light emission control device which causes the light emitting device to emit the auxiliary light for auto-focusing use when the shutter release button is half pressed and a desired output value is not obtained from the sensor; and a control device which, the auxiliary light for auto-focusing use emitted from the light emitting device in a state where the main capacitor is fully charged being supposed to be a first auxiliary light and the auxiliary light for auto-focusing use later emitted from the light emitting device when the shutter release button is half pressed again in a state where the main capacitor is not fully charged being supposed to be a second auxiliary light, following the emission of the first auxiliary light from the light emitting device, permits electric flash shooting by fully pressing the shutter release button after the charging of the main capacitor by the charging device as long as a first length of time and, following the emission of the second auxiliary light from the light emitting device, permits electric flash shooting by fully pressing the shutter release button after the charging of the main capacitor by the charging device as long as a second length of time longer than the first length of time.

According to the present invention, since the main capacitor is not always fully charged after an auxiliary light for auto-focusing use is emitted by half pressing the shutter release button, but it is charged only for a limited length of time, the operating convenience can be prevented from being deteriorated by charging.

Preferably, the control device, following the emission of the auxiliary light of an odd-numbered round from the light emitting device, permits electric flash shooting by fully pressing the shutter release button after the charging of the main capacitor by the charging device as long as the first length of time and, following the emission of the auxiliary light of an even-numbered round from the light emitting device, permits electric flash shooting by fully pressing the shutter release button after the charging of the main capacitor by the charging device as long as the second length of time.

According to the present invention, by setting that duration of charging to a required length of time for charging the main capacitor to a permissible minimum level to make possible electric flash shooting, impossibility of electric flash shooting due to insufficient charging can be reliably prevented.

Preferably, the first length of time is a length of time required for enabling the charging device to charge the main capacitor to a permissible minimum level to make possible electric flash shooting.

According to the present invention, by differentiating the length of time for charging according to whether or not the main capacitor is fully charged before auxiliary light emission, a more satisfactory performance can be achieved. Thus, since the remaining capacitance of the capacitor presumably is smaller after auxiliary light emission in a state in which it is not fully charged than after auxiliary light emission in a fully charged state, rational charging can be processed by charging the capacitor for a shorter period of time in the former case than in the latter case.

The present invention is also directed to a camera, comprising: a sensor having a plurality of light receiving elements which receive light from a subject in a range-finding area; an auto-focusing controller which performs auto-focusing control according to an output of the sensor; a charging device which charges a main capacitor; a light emitting device which is supplied with electric energy by the main capacitor and emits auxiliary light for auto-focusing use and auxiliary light for exposure use to the subject; a shutter release button which, when half pressed, causes auto-focusing control to be started according to the output of the sensor and, when fully pressed, causes shooting to be started; a light emission control device which causes the light emitting device to emit the auxiliary light for auto-focusing use when the shutter release button is half pressed and a desired output value is not obtained from the sensor; and a control device which, the auxiliary light for auto-focusing use emitted from the light emitting device in a state where the main capacitor is fully charged being supposed to be a first auxiliary light and the auxiliary light for auto-focusing use later emitted from the light emitting device when the shutter release button is half pressed again in a state where the main capacitor is not fully charged being supposed to be a second auxiliary light, following the emission of the first auxiliary light from the light emitting device, permits electric flash shooting by fully pressing the shutter release button after the charging of the main capacitor by the charging device to a permissible minimum level to make possible electric flash shooting and, following the emission of the second auxiliary light from the light emitting device, permits electric flash shooting by fully pressing the shutter release button after the charging of the main capacitor by the charging device to a fully charged level.

According to the present invention, since the main capacitor is not always fully charged after an auxiliary light for auto-focusing use is emitted by half pressing the shutter release button, but it is charged with a limited charging voltage, the operating convenience can be prevented from being deteriorated by charging. Also, by setting that charging voltage to a permissible minimum level to make possible electric flash shooting, impossibility of electric flash shooting due to insufficient charging can be reliably prevented.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 7(A) to 7(H) visualize a description of range-finding areas and peak selection regions of sensors;

FIGS. 11(A) to 11(E) illustrate sequences of processing for pre-emission of light;

FIG. 18 is a flow chart showing a procedure of charge processing by a CPU after pre-emission in the second embodiment according to the invention.

DETAILED DESCRIPTION OF THE PREFERRED EMBODIMENTS

A camera according to a preferred embodiment of the present invention will be described in detail below with reference to the accompanying drawings.

Figure 1:
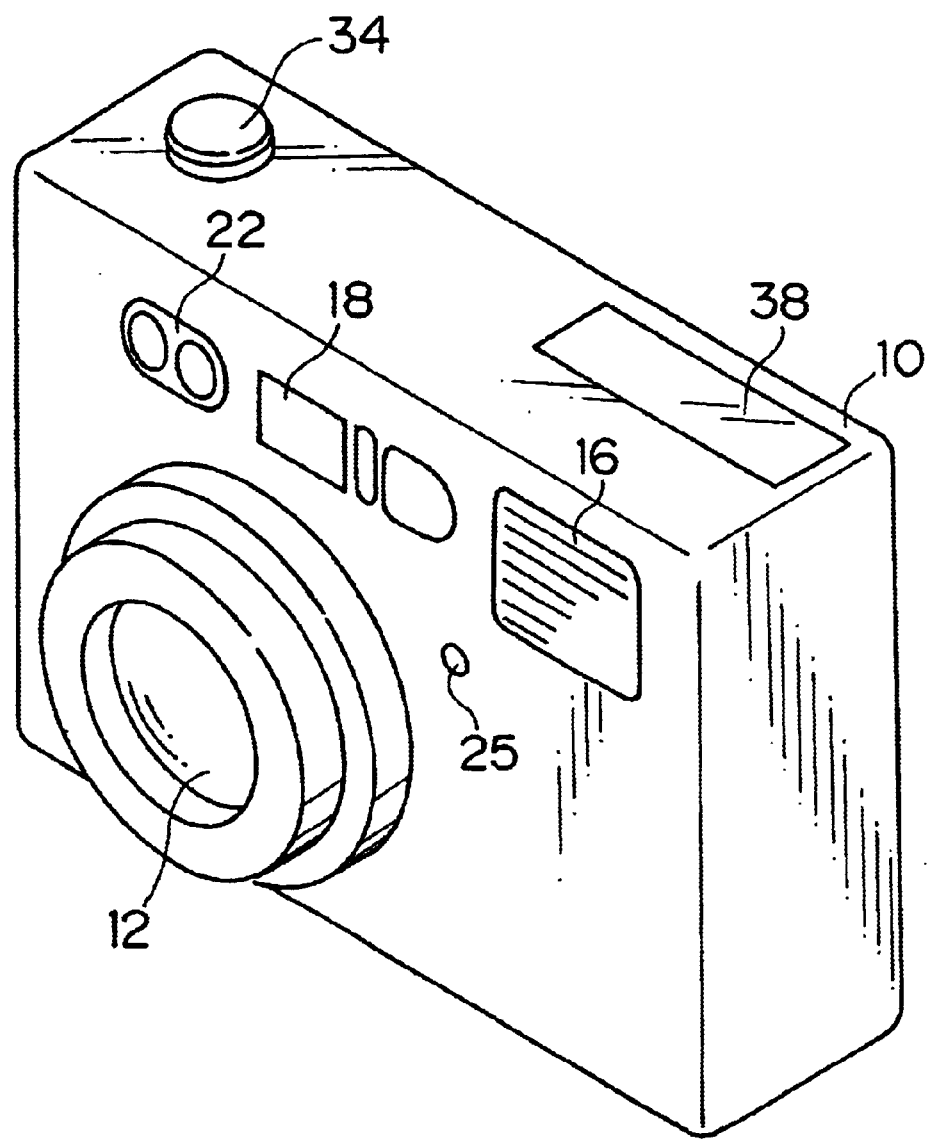
FIG. 1 shows a front perspective view of a camera according to an embodiment of the present invention.

FIG. 1 shows a front perspective view of a camera according to an embodiment of the present invention. As illustrated therein, a camera 10 is provided with, among other items, a zoom lens barrel 12 provided with a taking lens for forming an image of a subject on a silver halide film, a light emitting device 16 for emitting an auxiliary light to supplement the brightness of the subject at the time of shutter releasing (exposure to light) or range finding (auto-focusing), a view-finder window 18 for the user to confirm the subject to be shot, an AF window 22 with a built-in passive type sensor for measuring the distance to the subject (hereinafter referred to as the subject distance), a photometric window 25 with a built-in photometric device for measuring the brightness of the subject, and a shutter button 34, which the user manipulates when instructing a shutter release.

Figure 2:
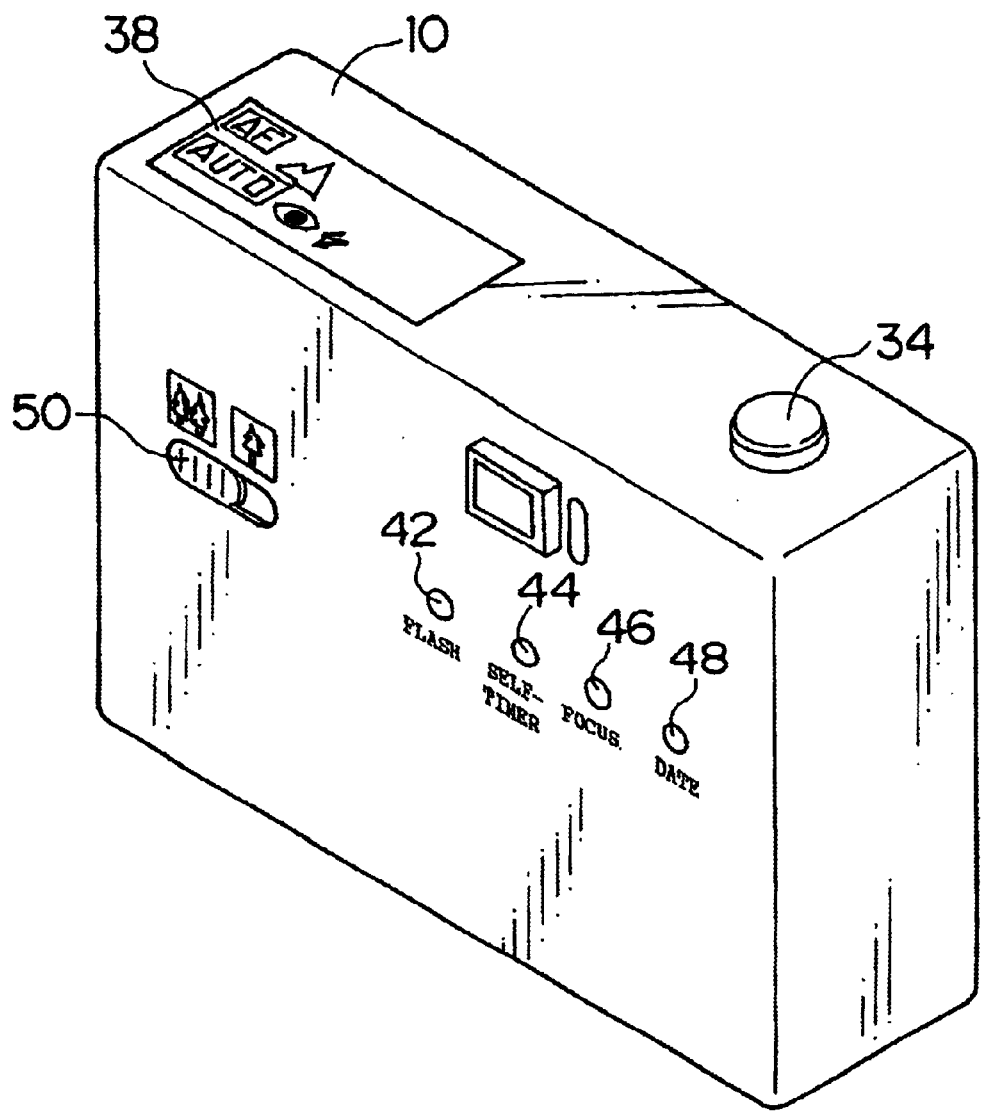
FIG. 2 shows a rear perspective view of the camera.

FIG. 2 shows a rear perspective view of the camera 10. As illustrated therein, the camera 10 is provided with a display device 38 for displaying the date and information including the auxiliary light emitting mode, the auto-focusing mode and the self-timer mode that are set, a flash button 42 for the user to set one or another of various modes of auxiliary light emission, a self-timer button 44 for setting the self-timer mode, a focusing button 46 for setting one or another of various shooting modes regarding auto-focusing, a date button 48 for setting the day, hours and minutes the camera 10 counts, and a zoom button 50 for the user instructs the shooting angle either to be wide-angle or telephoto-angle.

By manipulating the flash button 42, the user can select one or another of an auto mode for automatically emitting an auxiliary light, a red eye alleviating mode, a forced light emitting mode, a light emission forbidding mode, a night scene portrait mode and so forth. The user also can select desired focusing mode out of an auto-focusing mode, a distant view mode, a macro mode and so forth by manipulating the focusing button 46.

Figure 3:
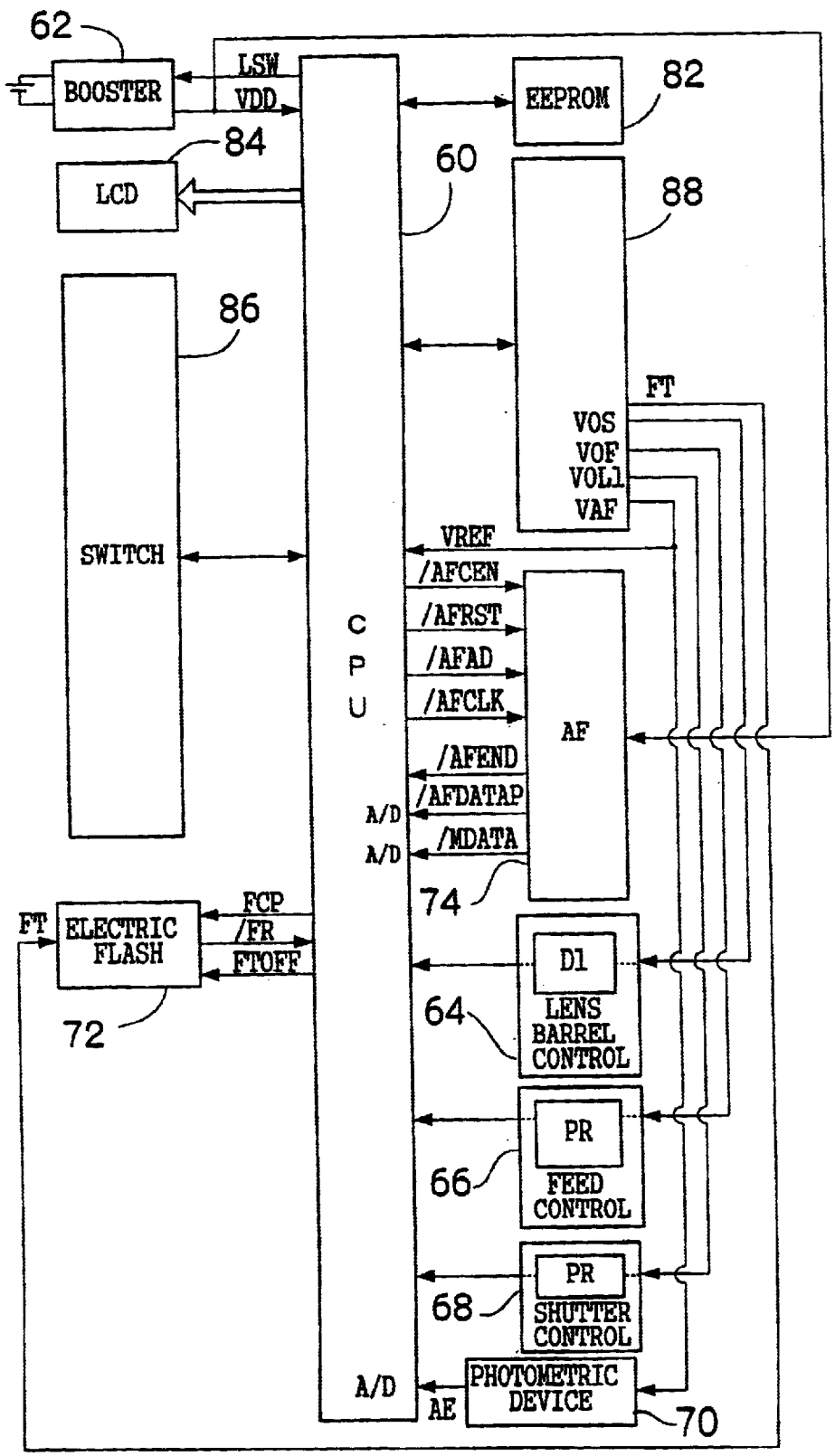
FIG. 3 is a block diagram illustrating a control section of the camera.

FIG. 3 is a block diagram illustrating a control section of the camera 10 described above. As illustrated therein, the camera 10 is provided with a CPU 60 (data processing device) for controlling the whole camera 10 to enable it to acquire information from different sections to be described below and to control these sections through instructions from the CPU 60. The CPU 60 shown in FIG. 3 may be an ASIC configured of peripheral circuits such as a CPU core unit, an I/O unit, a watchdog timer and an A/D converter.

Also as shown in FIG. 3, the camera 10 is provided with a regulator 62 for boosting and stabilizing the battery voltage and supplying power to the CPU 60 and its peripheral circuits, a lens barrel control device 64 (having functions of a shooting angle control device and an in-focus position control device) for controlling the zooming position and the focusing position of the zoom lens barrel 12 and supplying the CPU 60 with information on the zooming position and the focusing position, and a feed control device 66 for feeding and rewinding a silver halide film, if used as the image recording means, by a prescribed length and supplying a detection signal required for film feeding.

The camera 10 is further provided with a shutter control device 68 for controlling the opening and closing actions of the shutter when a picture is taken, a photometric device 70 for measuring the luminous energy of the subject on the basis of external light let in through the photometric window 25 shown in FIG. 1, a light emission control device 72 for controlling the charging of the main capacitor for storing light emitting energy and controlling the amount of auxiliary light emission from an electric flash (flash light) or the like on the basis of the brightness of external light measured by the photometric device 70, and a subject position determining device 74 for supplying information on the brightness of the subject let in through the AF window 22 shown in FIG. 1 and information on the position (the distance from the camera 10) of the subject, the two kinds of information being associated with each other.

The camera 10 is further provided with a programmable ROM 82 (recording means such as an EEPROM or the like) for rewritably recording parameters, data and processing programs regarding the control of the camera 10, information concerning range finding and other kinds of information, and a display control device 84 for supplying the display device 38 with signals for displaying graphics, characters, numerals and the like matching various modes in accordance with instructions from the CPU 60.

From an input device 86 comprising the shutter release button 34, the flash button 42, the self-timer button 44, the focusing button 46, the date button 48, the zoom button 50 and so forth shown in FIG. 2, signals matching manipulation of the different buttons are supplied to an 1/O device provided in the CPU 60. For the shutter release button 34, detection distinguishes between a half pressed state (a state in which SP1 is ON) and a fully pressed state (a state in which SP2 is ON).

A driver 88 shown in FIG. 3 controls a zoom drive motor and a focusing drive motor provided in the lens barrel control device 64 in accordance with instructions from the CPU 60, and thereby makes it possible to drive a film feed motor provided in the feed control device 66. The driver 88 can also supply a reference voltage and drive power to the AD converter circuit and the photometric device 70 in accordance with instructions from the CPU 60.

Further, the driver 88, in accordance with an instruction from the CPU 60, can supply a control signal for the shutter, which is opened and closed at the time of shutter release, to a shutter unit 68, and a signal to instruct the start and end of the emission of the auxiliary light to the light emission control device 72.

Figure 4:
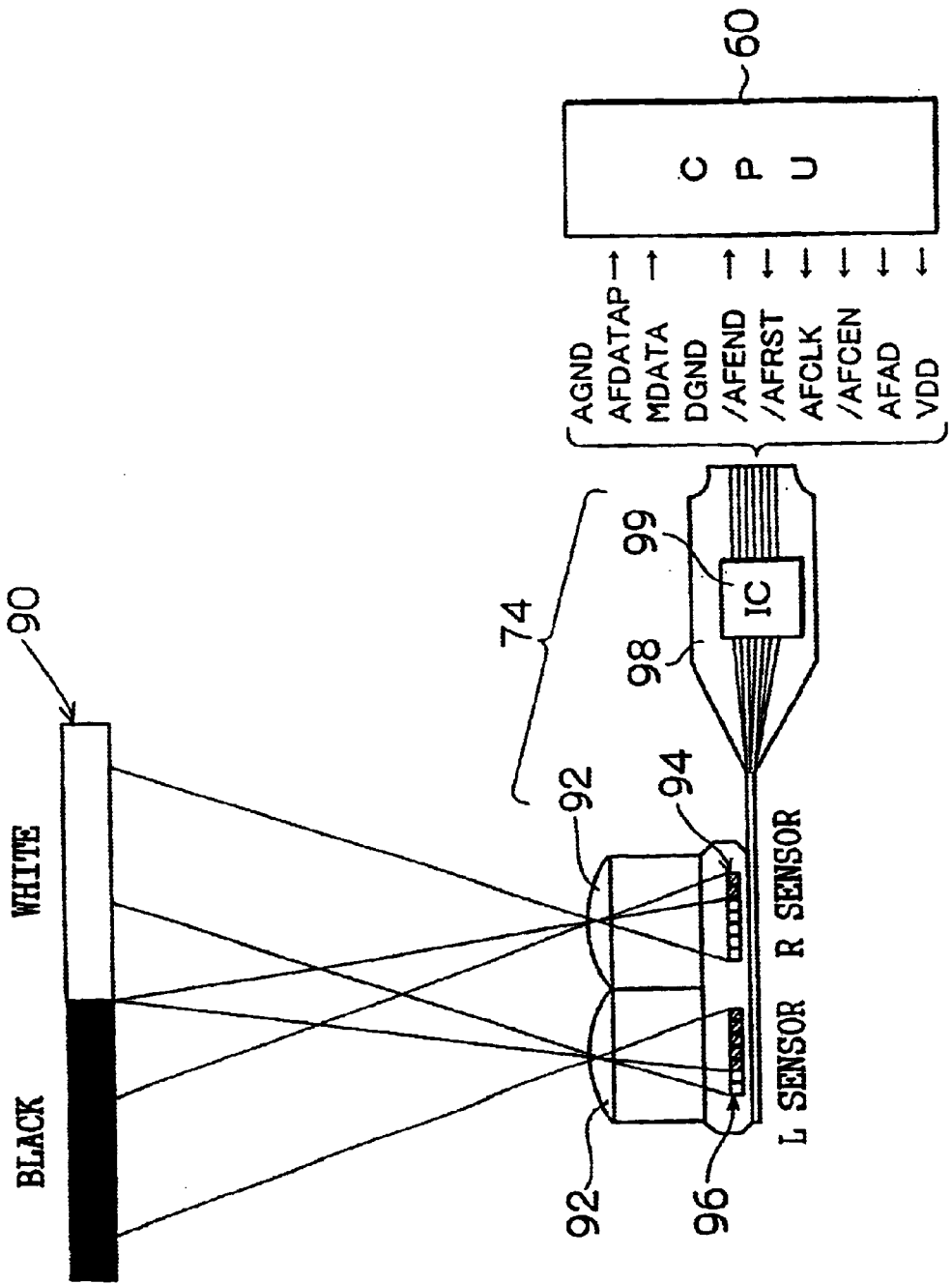
FIG. 4 shows a configuration of a subject position determining device by a passive system.

FIG. 4 shows the configuration of subject position determining device 74 by a passive system. As illustrated in FIG. 4, the subject position determining device 74 (AF sensor) is provided with a lens 92 for forming an image of a subject 90, composed of two colors which may be black and white for instance, on the light receiving face of each of the right and left sensors; an R sensor 94 on the right and an L sensor 96 on the left which photoelectrically convert and supply images formed on the respective light receiving faces; a flexible substrate 98 for sensor power to the R sensor 94 and the L sensor 96 and the voltages of optical signals (luminance signals) obtained by the photoelectric conversion to an IC 99, and the IC 99 for transmitting and receiving information and data to and from the CPU 60, controlling the R sensor 94 and the L sensor 96, and processing data reading.

The R sensor 94 and the L sensor 96 are, for instance, CMOS line sensors, each comprising a plurality of cells (light receiving elements) arranged linearly. The cells of the R sensor 94 and the L sensor 96 are to be identified by sensor numbers 1, 2, 3 . . . 233 and 234 sequentially from left to right in the diagrams. Five cells each at the left and right ends, respectively, of the R sensor 94 and the L sensor 96 are dummy cells, which are not actually used.

From the cells of the R sensor 94 and the L sensor 96 are successively supplied to the IC 99 optical signals (luminance signals) matching the luminous energy received by each and associated with sensor numbers. The IC 99 integrates (adds up) the luminance signals of the cells obtained from the R sensor 94 and the L sensor 96, on a cell-by-cell basis, and acquires the integral of luminance signals (the integral of the luminous energy) for each cell. In the following description, simple reference to an integral will mean an integral of luminance signals, and that of integration or integral processing will mean integration or integral processing to obtain an integral of luminance signals.

When the IC 99 detects that the integral of any cell has reached a prescribed value (an end-of-integration value) within a peak selection region, which is described afterwards and set in the sensor region (within all the cells) of each of the R sensor 94 and the L sensor 96 (i.e., when the IC 99 judges that sufficient data for range finding have been obtained where a prescribed level of luminous energy has been obtained), the IC 99 ends integral processing, and supplies the CPU 60 with signal indicating the end of integral processing (an end-of-integration signal). The value to be supplied to the CPU 60 as integral for each cell is the balance of the subtraction of the luminance signal integral of each cell from a prescribed reference value. The greater the luminous energy received, the smaller the integral. In the following description, the balance of the subtraction of the luminance signal integral from the reference value will be referred to as the luminance signal integral.

The CPU 60 instructs the IC 99 to start or forcibly end the above-described integral processing and to read the integral of each cell, and designates the peak selection region, high or low sensor sensitivity (gain of the integral) and so forth. The CPU 60, upon reception of an end-of-integration signal from the IC 99 as described above or upon forced ending of integral processing, acquires from the IC 99 the integrals of different cells matched with sensor numbers. An image picked up by each of R sensor 94 and the L sensor 96 (hereinafter referred to as a sensor image) is thereby acquired. Then, correlation computing between the sensor images of the R sensor 94 and of the L sensor 96 is performed to find out the discrepancy between the sensor images and thereby to figure out the distance to the subject 90 (the principle of trigonometrical measurement).

To additionally describe the kinds of input/output signals provided for the IC 99 shown in FIG. 4, VDD stands a power supply line, AGND, a ground line for analog signals, and DGND, a ground line for digital signals. There are further provided, as signal lines for inputs to the IC 99 from the CPU 60, /AFCEN for instructing the setting of the IC 99 into an operating state or a non-operating state, /AFRST for instructing the setting of control data, AFAD for setting control data, and AFCLK for instructing at up edge the timing of reading control data in. On the other hand, as signal lines for outputs from the IC 99 to the CPU 60, there are provided AFDATAP to supply as analog data of balances of subtraction of the integrals of luminance signals of cells provided in the sensors from a reference voltage VREF, MDATA to supply as analog data of the maximum integral in the peak selection region set according to AFAD signals, and/AFEND to supply a signal notifying the start timing of integration and indicating that the maximum integral in the peak selection region has reached a prescribed setpoint.

Figure 5:
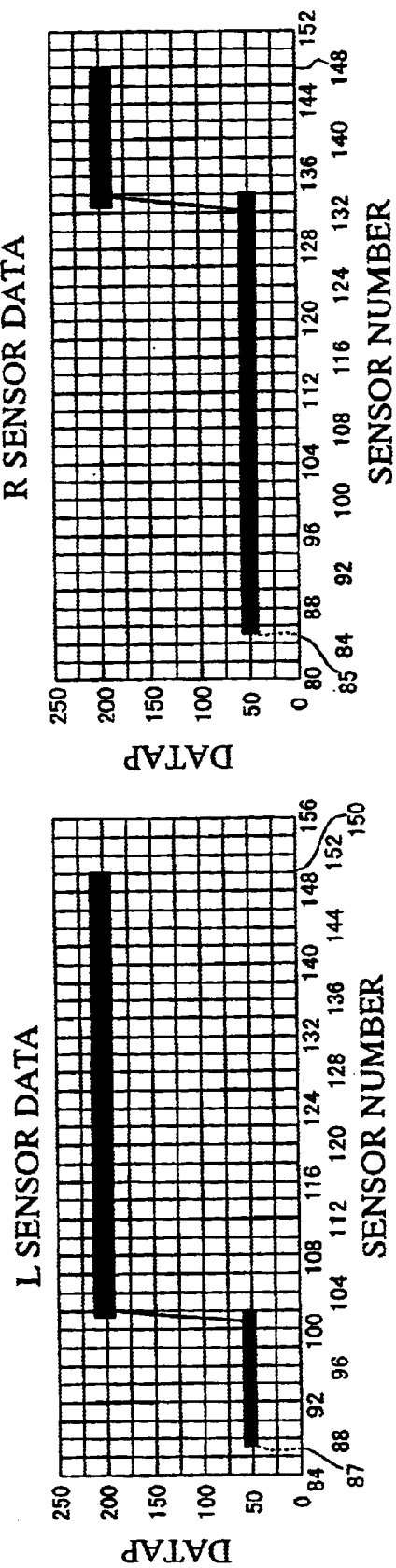
FIG. 5 shows an example of a sensor image where a distance from a subject position determining device to the subject is short.
Figure 6:
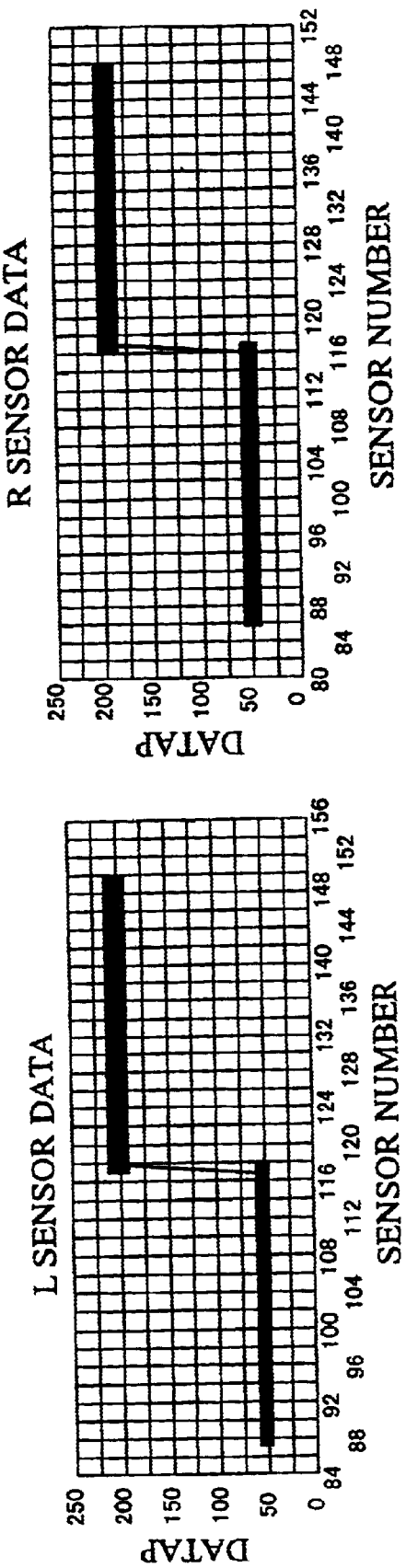
FIG. 6 shows an example of sensor image where the distance from a subject position determining device to a subject is long.

FIGS. 5 and 6 show examples of sensor image where the distance from the subject position determining device 74 to the subject 90 is short and long, respectively. Where the distance to the subject 90 is short, as shown in FIG. 5, the integral of luminance signals to sensor numbers 87 to 101 of the L sensor 96 takes on a brighter value (50), and that of luminance signals to its sensor numbers 102 to 150 takes on a darker value (200). Regarding the R sensor 94, as it is arranged in a different position from the L sensor 96, the integral of luminance signals to sensor numbers 85 to 133 takes on a brighter value (50) while that of luminance signals to sensor numbers 134 to 148 takes on a darker value (200).

On the other hand, where the distance to the subject 90 is long (for instance, almost infinitely long), the integral of luminance energies to sensor numbers 87 to 117 of the L sensor 96 takes on a brighter value (50), while that of luminance energies to its sensor numbers 118 to 150 takes on a darker value (200) as shown in FIG. 6. On the other hand, regarding the R sensor 94, though it is arranged in a different position from the L sensor 96 but because the subject position is at a long distance, the integral of luminance energies to sensor numbers 85 to 116 takes on a brighter value (50), while that of luminance energies to sensor numbers 117 to 148 takes on a darker value (200). In this case, the CPU 60 can judge that there is virtually no lag amount between the sensor images of the R sensor 94 and of the L sensor 96 and accordingly that the subject is at an almost infinitely long distance. Unlike in this case, where the subject is at a short distance as shown in FIG. 5, the lag amount of sensor images is greater.

Quantitatively, the subject distance can be computed from the lag amount of sensor images, with the spacing between the R sensor 94 and the L sensor 96, the distance from sensors to the lens 92, and the pitch of cells in the R sensor 94 and the L sensor 96 (e.g., 12 µm) among other factors taken into consideration.

The lag amount of sensor images can be figured out by correlation computing between the sensor images of the R sensor 94 and of the L sensor 96. For instance, window regions each containing the same number (total number WO) of cells are set for the R sensor 94 and the L sensor 96, and the integral of luminance signals of numbers i of the cells in those window regions (not the above-mentioned sensor numbers but numbers assigned to cells in the respective window regions of the R sensor 94 and the L sensor 96 in the same arrangement (for instance sequentially, from right to left, 1 to WO)) are represented by R(i) for the R sensor 94 and L(i) for the L sensor 96. Here, the correlation f is:

$$f = \Sigma |L(i) - R(i)| (i=1 \text{ to } WO).$$

Then, if the correlation f is sought for while the relative positions of (distance between) the window regions of the R sensor 94 and of the L sensor 96 are shifted by, for instance, one cell at a time, a point where the correlation f is at its minimum will be detected. For example, where f(n) represents the correlation where the window regions of the R sensor 94 and of the L sensor 96 are shifted by an n cells equivalent in the direction of deviating from reference relative positions of window regions (for instance positions in a relationship of giving the minimum correlation f to a subject at an infinitely long distance), n at the time of detection of the minimum correlation f(n) will represent the lag amount of sensor images. The computing to find out the correlation f(n) will hereinafter be referred to as correlation computing.

Figures 7A, 7B, 7C, 7D, 7E, 7F, 7G, 7H:
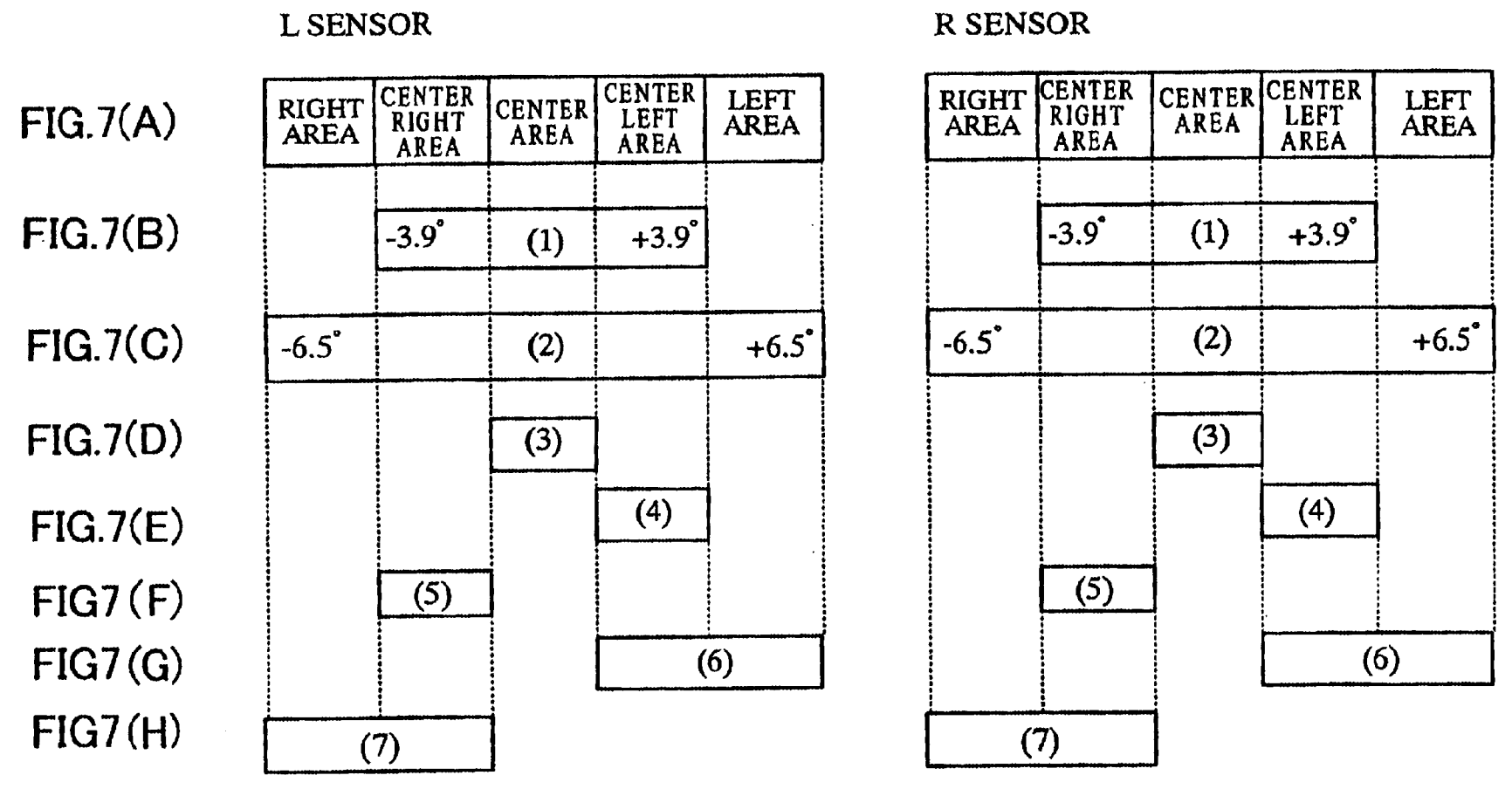

In the present embodiment, the sensor region of each of the R sensor 94 and the L sensor 96 is divided into five areas including the "right area", "center right area", "center area", "center left area" and "left area" (each of these areas will hereinafter be referred to as a range-finding area) as shown in FIG. 7(A), and the correlation computing described above is done individually performed between the matching range-finding areas (between range-finding areas of the same name) of the R sensor 94 and of the L sensor 96 to figure out the subject distances. Therefore, the subject distances can be determined for a maximum of five range-finding areas. If the zooming position is set more toward the wide-angle side (for instance, in ranges Z1 to Z5 where the zooming position is divided into six ranges Z1 to Z6) than the prescribed zooming position, the correlation computing is done for all the five range-finding areas, and the subject distance is computed for each range-finding area. The same is true in the macro mode as well. If the zooming position is set more toward the telephoto angle side than is prescribed (in range Z6 of the above-stated division), the correlation computing is done for three range findings areas including the center right, center and center left areas, and the subject distance is computed for each range-finding area. In either case, a plurality of subject distances may be sometimes figured out for a plurality of range-finding areas, the shortest of the figured-out subject distances will be used as a rule for the control of the lens barrel control device 64.

Also, for peak selection regions where it is judged whether or not the integral of any cell has reached an end-of-integration value in ending integral processing, the five divided range-finding areas provide the basis, and one or another of the seven peak selection regions indicated by (1) to (7) in FIGS. 7(B) to 7(H) is set. Peak selection region (1) consists of the three "center right, center and center left" range-finding areas, and this is selected when the zooming position is toward the telephoto angle side (the above-described Z6). The extent of angles of the peak selection region here is ±3.9 degrees. Peak selection region (2) consists of all the "right, center right, center, center left and left" range-finding areas, this is selected when the zooming position is toward the wide-angle side (the above-described Z1 to Z5 and in the macro mode). The extent of angles of the peak selection region here is ±6.5 degrees. Peak selection regions (3), (4) and (5) respectively consist of the center area, the center left area and the right center area, and peak selection regions (4) and (5) in particular are used when the zooming position is toward the telephoto angle side and the luminance of the subject is high. Peak selection regions (6) and (7) respectively consist of the "right and center right" areas and the "left and center left" areas, and they are used when the zooming position is toward the wide-angle side and the luminance of the subject is high. Peak selection region (3) is used when the luminance of the subject is high, whether the zooming position is toward the telephoto angle side or toward the wide-angle side. As a rule, the subject distance is figured out by the above-described correlation computing with respect to the range-finding area selected as the peak selection region. What peak selection region is to be used in what case will be explained in detail with reference to the following flow chart.

Figure 8:
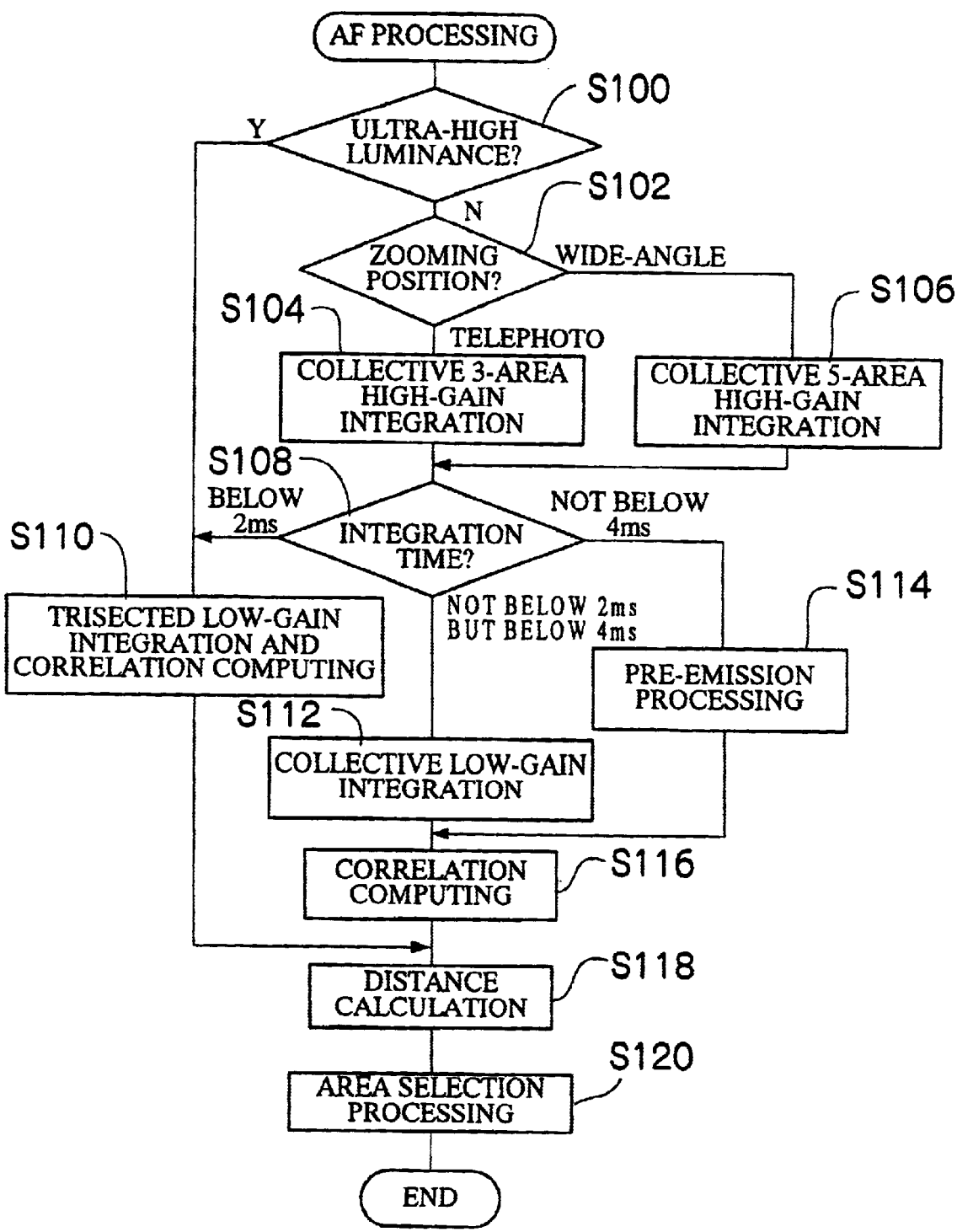
FIG. 8 is a flow chart regarding range-finder processing by a CPU.

FIG. 8 is a flow chart regarding range-finder processing by the CPU 60 referred to above. When the processing mode of the camera 10 is set for shooting mode and the user half-presses the shutter release button 34, the CPU 60 acquires from the input device 86 an SP1 ON signal indicating that shutter release button 34 has been pressed. When the SP1 ON signal is acquired, the CPU 60 sets an AE matching the luminance of the subject in order to shoot the subject 90, and starts processing the subject 90 which has been specified.

When it is to perform processing to specify the subject 90 for the camera 10 and to focus on it, the CPU 60 first branches into a processing routine for AF range finding shown in FIG. 8 to specify the subject and measure its distance.

In the processing routine for AF range finding, first the CPU 60 references the signal output of the luminous energy supplied by the photometric device 70, and judges whether or not the luminous energy of the subject is at or above a prescribed luminance threshold, which is deemed to be an ultra-high level of luminance (step S100). If it is judged NO, then the CPU 60 acquires information regarding the currently set zooming position (set picture angle) from the lens barrel control device 64, and judges whether the currently set zooming position is toward the telephoto angle side or toward the wide-angle side with respect to the prescribed zooming position (step S102). If it is judged to be toward the telephoto angle side, the CPU 60 instructs the IC 99 of the subject position determining device 74 to set the peak selection region to the above-described region (1) (see FIG. 7(B)), namely the three "center right, center and center left" areas, and sets the sensor sensitivities of the R sensor 94 and the L sensor 96 to a high sensitivity level. Then, integral processing is caused to be started (step S104). Or if it is judged at step S102 to be toward the wide-angle side, the peak selection region is set to the above-described region (2) (see FIG. 7(C)), namely the five "right, center right, center, center left and left" areas, and sets the sensor sensitivities of the R sensor 94 and the L sensor 96 to a high sensitivity level. Then, integral processing is caused to be started (step S106). To add, processing at steps S104 and S106 is integral processing to determine the relative luminance level of the subject, and this kind of processing will be hereinafter referred to as high sensitivity pre-integration.

Then the CPU 60 judges whether or not the integral processing has ended and, if it has, judges whether the integration took less than 2 ms or not less than 2 ms but less than 4 ms, or has not ended even in 4 ms (step S108).

If the integration has ended in less than 2 ms, trisected low-gain integral processing (and correlation computing) will be executed as will be described afterwards (step S110). If it has ended in not less than 2 ms but less than 4 ms, collective low-gain integral processing will be executed (step S112). If it has not ended even in 4 ms, the integration will be continued until 100 ms has passed, and if it still has not ended, pre-emission processing will be executed (step S114) after switching to collective low-gain integral processing.

If the judgment at the above-described step S100 is YES, i.e., an ultra-high level of luminance is determined, trisected low-gain integral processing will be executed (step S110) as in the case of ending in less than 2 ms.

In the trisected low-gain integral processing at step S110, the sensor sensitivity of the R sensor 94 and the L sensor 96 is set to a low level, the range-finding area to be used according to the zooming position is trisected, and integral processing is executed sequentially, with each divided area being used as the peak selection region. If integral processing is to be started anew, the integral already obtained by the subject position determining device 74 is reset (the same applies hereinafter).

Thus, if the zooming position is toward the telephoto angle side, the range-finding areas to be used are three including the center right, center and center left range-finding areas, and these range-finding areas are trisected into the center right, center and center left areas, and integral processing is executed sequentially, with each of the range-finding areas being used as the peak selection region. More specifically, first the center area is set to be the peak selection region, and integral processing is executed. Also, on the basis of the integral thereby obtained for each cell within the center area, correlation computing is performed in the center area. Then, the center left area is set to be the peak selection region, and integral processing is executed. As in the foregoing case, correlation computing is performed in the center left area on the basis of the integral obtained for each cell within the center left area. Then, the center right area is set to be the peak selection region, and integral processing is executed. As in the foregoing case, correlation computing is performed in the center right area on the basis of the integral obtained for each cell within the center right area.

On the other hand, if the zooming position is toward the wide-angle side, the range-finding areas to be used are five including the right, center right, center, center left and left range-finding areas, and these range-finding areas are trisected into the "right and center right", center and "center left and left" areas, and integral processing is executed sequentially, with each area being used as the peak selection region. First, the center area is set to be the peak selection region, and integral processing is executed. Then, as in the foregoing case, correlation computing is performed in the center area on the basis of the integral obtained for each cell within the center area. Next, the "center left and left" areas are set to be the peak selection region, and integral processing is executed. In this case, with the left area and the center left area being treated as separate areas, correlation computing is performed in the left area and the center left area on the basis of the integral obtained for each cell within the left area and the center left area. Next, the "center right and right" areas are set to be the peak selection region, and integral processing is executed. Then as in the foregoing case, the right area and the center right area being treated as separate range-finding areas, correlation computing is performed in the right area and the center right area on the basis of the integral obtained for each cell within the right area and the center right area.

In the collective low-gain integral processing at step S112, the sensor sensitivity of the R sensor 94 and the L sensor 96 is set to a low level, and integral processing is executed, with the same area as the range-finding area to be used being assigned as the peak selection region. Thus if the zooming position is toward the telephoto angle side, the range-finding areas to be used are three including the center right, center and center left range-finding areas, and integral processing is executed, with the "center right, center and center left" range-finding areas are put together being used as the peak selection region. If the zooming position is toward the wide-angle side, the range-finding areas to be used are five including the right, center right, center, center left and left areas, and integral processing is executed, with the "right, center right, center, center left and left" area into which these range-finding areas are put together being used as the peak selection region. When the integral for each cell in the peak selection region is acquired by step S112, correlation computing is performed for each range-finding area (step S116).

Pre-emission processing at step 114 is processing to execute integral processing with an auxiliary light being emitted from an electric flash (light emitting device 16). Its details will be described afterwards. When the integral for each cell in the peak selection region is acquired by the pre-emission processing, correlation computing is performed for each range-finding area (step S116).

Having acquired the correlation by correlation computing for each range-finding area as described so far, the CPU 60 determines the lag amount between the sensor images of the R sensor 94 and of the L sensor 96, and computes the subject distance for each range-finding area (step S118). To add, the distances from the R sensor 94 and the L sensor 96 to the film surface within the camera 10 are also taken into account in figuring out the subject distance, and the distance from the film surface to the subject (the subject distance) is figured out.

Next, the CPU 60 performs processing to select the subject distance which is judged to be the most appropriate out of the plurality of subject distances acquired for each range-finding area (step S120). Usually, it selects the shortest subject distance among the plurality of subject distances. However, in view of the circumstance that a subject not intended by the user may often be present at an extremely short distance, the selection may flexibly respond to different conditions of the subject 90 where only one area is at an extremely short distance and all other subject distances are medium or longer by, for instance, selecting the shortest subject distance elsewhere than the extremely short distance instead of selecting the extremely short subject distance.

Upon completion of step S120, the CPU 60 ends the processing routine of the AF range finding.

After this, the CPU 60 supplies the lens barrel control device 64 with information for setting the focusing position of the zoom lens barrel 12 to the subject distance selected at the above-described S120. Upon completion of the setting of the focusing position, the CPU 60 notifies the user by displaying on the display device 38 or elsewhere information that the setting of the focusing position has ended.

When the user fully presses the shutter release button 34 to instruct shooting, the CPU 60 acquires from the input device 86 an SP2 ON signal indicating that the shutter release button 34 has been fully pressed. Having acquired the SP2 signal, the CPU 60 performs processing to set the lens aperture and the shutter speed on the basis of the subject brightness measured by the photometric device 70 and the shooting mode set in the camera 10. It then gives an instruction to open and close the shutter to the shutter control device 68 and, if the result of measurement by the photometric device 70 indicates necessity, an instruction to emit an auxiliary light to the light emission control device 72.

Figure 9:
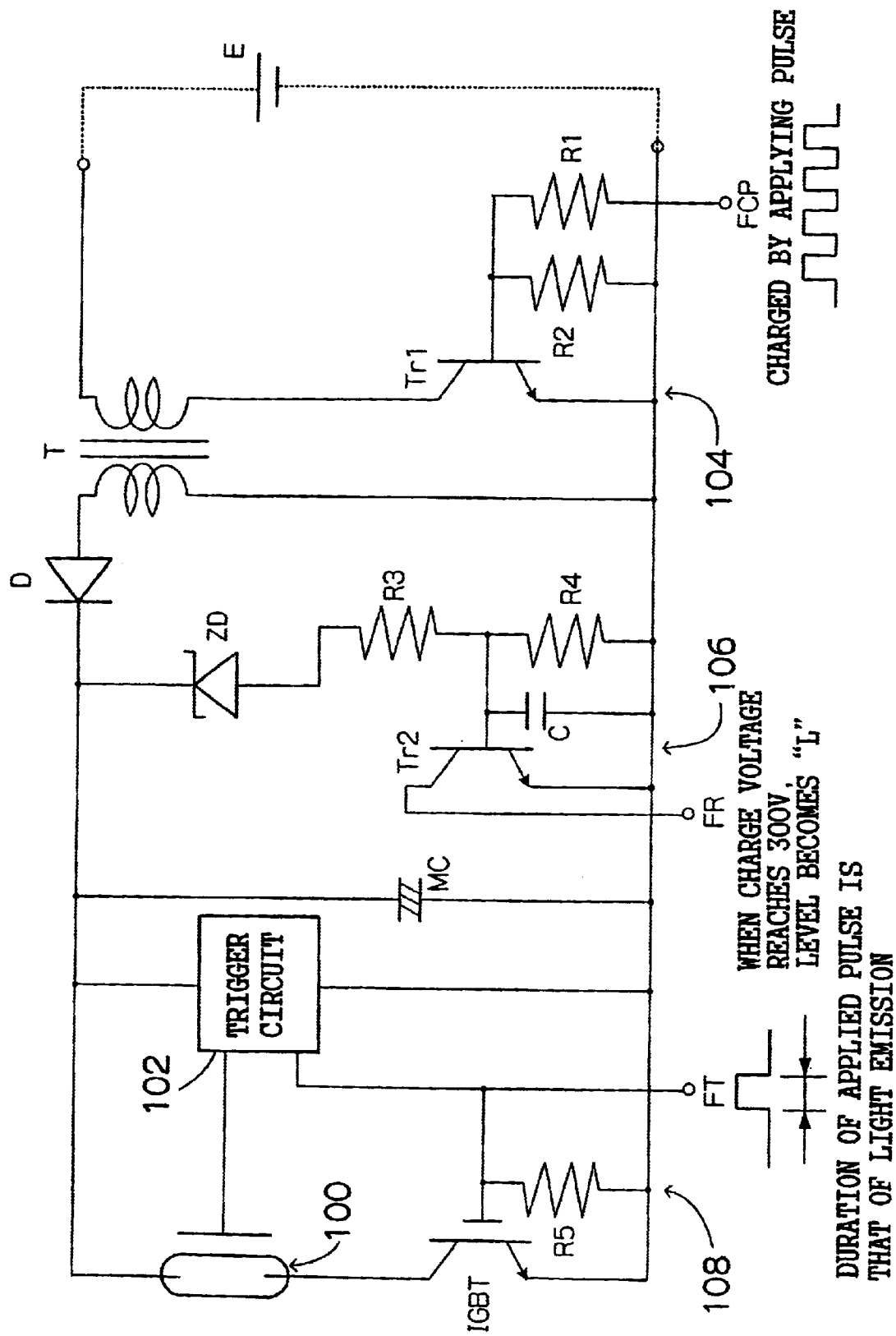
FIG. 9 is a circuit diagram showing a configuration of an electric flash circuit.

FIG. 9 is a circuit diagram showing the configuration of an electric flash circuit in the light emission control device 72. As shown in this diagram, the electric flash circuit comprises a xenon gas-enclosed discharge tube 100, a trigger circuit 102 for applying a high voltage to the trigger electrode of the discharge tube 100 to excite the xenon gas within the discharge tube 100 and thereby to reduce the resistance within the discharge tube 100, a main capacitor MC for accumulating electric charges which causes the discharge tube 100 to emit light and discharges its charges to the discharge tube 100, and a transformer T which boosts the voltage of a battery E and causes the main capacitor MC and the triggering capacitor in the trigger circuit 102 to accumulate charges at a high voltage.

To the primary side of the transformer T where the battery E is connected is connected a switch circuit 104 comprising a transistor Tr1 and resistors R1 and R2. When a pulse string signal is given to this switch circuit 104 from the CPU 60 via an FCP signal line, the transistor Tr1 of the switch circuit 104 repeats coming on and off, and an alternating current is generated on the primary side of the transformer T. This induces an alternating current of a high voltage on the secondary side of the transformer T. The A.C. voltage induced on the secondary side of the transformer T is rectified by a diode D, and the rectified voltage is applied to the main capacitor MC and the triggering capacitor in the trigger circuit 102. Therefore, when a pulse train signal is provided from the FCP signal line, the main capacitor MC and the triggering capacitor are charged. If the CPU 60 stops supplying the pulse train signal to the FCP signal line, the charging is stopped.

To the main capacitor MC is connected a charge completion detecting circuit 106 comprising a Zener diode ZD, a transistor Tr2, a capacitor C, and resistors R3 and R4 in parallel. The Zener diode ZD has a characteristic that an avalanche current flows in it when a voltage over 300 V (Zener voltage) is applied to it in the inverse direction. When the charge voltage to the main capacitor MC reaches the Zener voltage, a current flows to resistors R3 and R4 of the charge completion detecting circuit 106. This causes a transistor Tr2 to be turned on and reduces the FR signal line to an L level. On the other hand, when the charge voltage to the main capacitor MC has not reached the Zener voltage, the transistor Tr2 is off and the FR signal line is at an H level. Therefore, the CPU 60 can know by the voltage of the FR signal line whether or not the charging of the main capacitor MC has been completed.

Into the trigger circuit 102 is entered a pulse signal from the CPU 60 via the FT signal line. When the pulse signal is entered from the FT signal line, the trigger circuit 102 applies a high voltage to the trigger electrode of the discharge tube 100 to reduce the resistance in the discharge tube 100 and thereby makes possible discharging from the main capacitor MC to the discharge tube 100. Further to the discharge tube 100 is connected a switch circuit 108 comprising a transistor (insulated gate type bipolar transistor) IGBT and a resistor R5, and the same pulse signal as that for the aforementioned trigger circuit 102 is entered into this switch circuit 108 via the FT signal line. When the pulse signal is entered via the FT signal line, the transistor IGBT is turned on at the H level of that pulse signal and the transistor IGBT is turned off at its L level.

Therefore, the discharge tube 100 emits light only during the period equal to the pulse width of the pulse signal which the CPU 60 applies to the trigger circuit 102 and the switch circuit 108 via the FT signal line. Thus, the pulse width is equal to the duration of light emission by the discharge tube 100. To add, in the pre-emission for range finding, a pulse signal of 8 to 28 μs per time of emission is entered from the FT signal line, and a pulse signal of 5 ms (though the actual duration of light emission is only about 1 ms) is entered during a real emission (full emission for usual shooting) synchronized with a shutter release.

Figure 10:
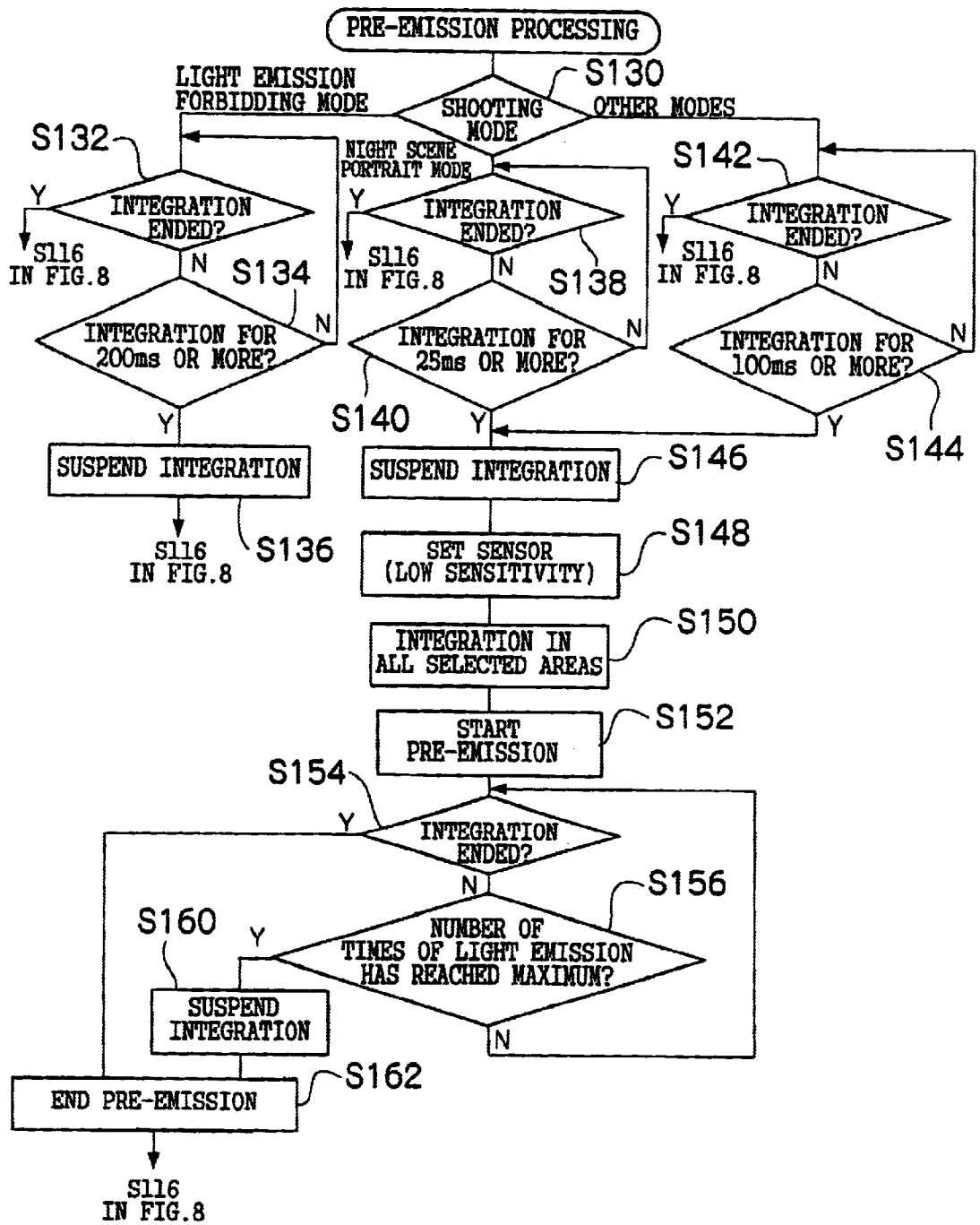
FIG. 10 is a flow chart regarding pre-emission processing by the CPU.

Pre-emission processing by the CPU 60 at step S114 in FIG. 8 will be described below in detail with reference to a flow chart in FIG. 10. After high sensitivity pre-integration processing is started at step S104 or step S106 in FIG. 8, if the processing is judged not to have ended at step S108 even after the lapse of 4 ms in the duration of integration, the CPU 60 will shift to pre-emission processing shown in FIG. 10. First, while allowing that integral processing to continue, the CPU 60 judges in which of the light emission forbidding mode, the night scene portrait mode or any other mode (the auto mode, the red eye alleviating mode or the forced light emitting mode) the shooting mode is set (step S130). If it is judged to be set in the light emission forbidding mode, the CPU 60 judges whether or not integration has been ended (step S132). If the judgment is NO here, then the CPU 60 judges whether or not the duration of integration has reached or surpassed 200 ms (step S1134). If the judgment is again NO, the process returns to the above-described step S132. As long as the judgment is NO at both step S132 and step S134, these procedures of judgment are repeated. If the judgment turns YES at step S132, i.e., the integration has ended before the its duration reaches 200 ms, the integral of each cell is acquired, and this pre-emission processing is ended without actually executing pre-emission. On the other hand, if the judgment at step S134 is YES, i.e., the duration of integration has reached 200 ms without completion, the integration is forcibly suspended (step S136), and the integral of each cell at the time is acquired to end this pre-emission processing without actually executing pre-emission. Thus, when the shooting mode is set in the light emission forbidding mode, the integration is continued for a duration of no more than 200 ms, and even if it fails to end within this length of time (i.e., if range finding seems difficult), processing at and after step S116 in FIG. 8 is executed without performing pre-emission.

If at the above-described step S130 it is judged that the shooting mode is in the night scene portrait mode, then it is judged whether or not integration has ended (step S138). If the judgment is NO here, next it is judged whether or not the duration of integration has reached or surpassed 25 ms (step S140), if the judgment is again NO, the process returns to the above-described step S138. As long as the judgment is NO at both step S138 and step S140, these procedures of judgment are repeated. If the judgment turns YES at step S138, i.e., the integration has ended before the its duration reaches 25 ms, the integral of each cell is acquired, and this pre-emission processing is ended without actually executing pre-emission, followed by the processing at step S116 in FIG. 8. On the other hand, if the judgment at step S140 is YES, i.e., the duration of integration has reached 25 ms without completion, the integration is forcibly suspended (step S146), followed by a shift to step S148 for processing pre-emission.

If at the above-described step S130 it is judged that the shooting mode is in any other mode than the light emission forbidding mode and the night scene portrait mode, i.e., in the auto mode, the red eye alleviating mode and the forced light emitting mode in the present embodiment, then the CPU 60 judges whether or not the integration had ended (step S142). If the judgment is NO here, the CPU 60 judges whether or not the duration of integration has reached or surpassed 100ms (step S144). If the judgment is NO again, the process returns to the above-described step S142. As long as the judgment is NO at both step S142 and step S144, these procedures of judgment are repeated. If the judgment turns YES at step S142, i.e., the integration has ended before the its duration reaches 100 ms, the integral of each cell is acquired, and this pre-emission processing is ended without actually executing pre-emission, followed by the processing at step S116 in FIG. 8. On the other hand, if the judgment at step S144 is YES, i.e., the duration of integration has reached 100 ms without completion, the integration is forcibly suspended (step S146), followed by a shift to step S148 for processing pre-emission by the light emitting device 16.

Since in the night scene portrait mode it is judged whether or not integral processing has ended after the lapse of a shorter period of time than in any other mode than the light emission forbidding mode and the night scene portrait mode, i.e., 25 ms as opposed to 100 ms (step S140), pre-emission is performed in a brighter condition than in other modes. This prevents the trouble that pre-emission is not performed on account of the brightness of the background, and that of focusing on anything in the background is also prevented.

Suspending the integration at the above-described step S146 and shifting to step S148, next the CPU 60 instructs the IC 99 of the subject position determining device 74 to set the sensor sensitivity of the R sensor 94 and of the L sensor 96 to a low level, and causes integration to start in the full peak selection range (step S150). It then the CPU 60 instructs the light emission control device 72 to start pre-emission (step S152). Thus, it applies a pulse signal to the FT signal line of the electric flash circuit shown in FIG. 9 to cause the discharge tube 100 to emit light.

Pre-emission is intermittently repeated in a prescribed duration (width of emission) and at prescribed intervals until the conditions for completion in the following judgment processing are satisfied. Details of the duration and intervals of light emission will be described afterwards.

As an ending condition for pre-emission, the CPU 60 first judges whether or not the integration has ended (step S154). If the judgment is YES, pre-emission is ended (step S162), and the integral of each cell is acquired to end this pre-emission processing, followed by the processing at step S116 in FIG. 8. Or if the judgment is NO, then the CPU 60 judges whether or not the number of times of pre-emission has reached a predetermined maximum number of times (four times for instance) (step S156). If the judgment is YES, the integration is forcibly ended even if it is not completed (step S160) to end pre-emission (step S162). The CPU 60 acquires the integral of each cell at that point of time to end this pre-emission, and a shift to step S116 in FIG. 8 takes place. If at step S156 the judgment is NO, the process returns to the above-described step S154, and pre-emission is continued, with the foregoing judgment processing repeated until any of the above-stated ending conditions is met.

The sequence of pre-emission processing so far described will now be described with reference to FIGS. 11(A) to 11(E). Description of the case in which the shooting mode is the light emission forbidding mode will be dispensed with. After starting high sensitivity preintegration by half-pressing the shutter release button 34, when integral processing is ended in less than 100 ms as shown in FIG. 11(A) (in less than 25 ms in the night scene portrait mode), without performing pre-emission, correlation computing is performed using the integrals thereby obtained, and the subject distance is calculated.

On the other hand, if after the half pressing of the shutter release button 34, high sensitivity pre-integration does not end in less the applicable one of the aforementioned durations as shown in FIGS. 11(B) to 11(E), the sensor sensitivity of the R sensor 94 and of the L sensor 96 is altered to a low level, and integral processing is started again. Then, after the lapse of 5 ms, the first pre-emission is performed.

Here in this first pre-emission, the CPU 60 shortens the duration of light emission (emission width) so that the luminous energy of emission is smaller than the second or any subsequent pre-emission. If, for instance, the duration of the second or subsequent pre-emission is 28 $\mu$s, the duration of the first pre-emission is 16 $\mu$s. This prevents the trouble of sensor output saturation or the like even if, for instance, the subject is extremely close.

Figure 12:
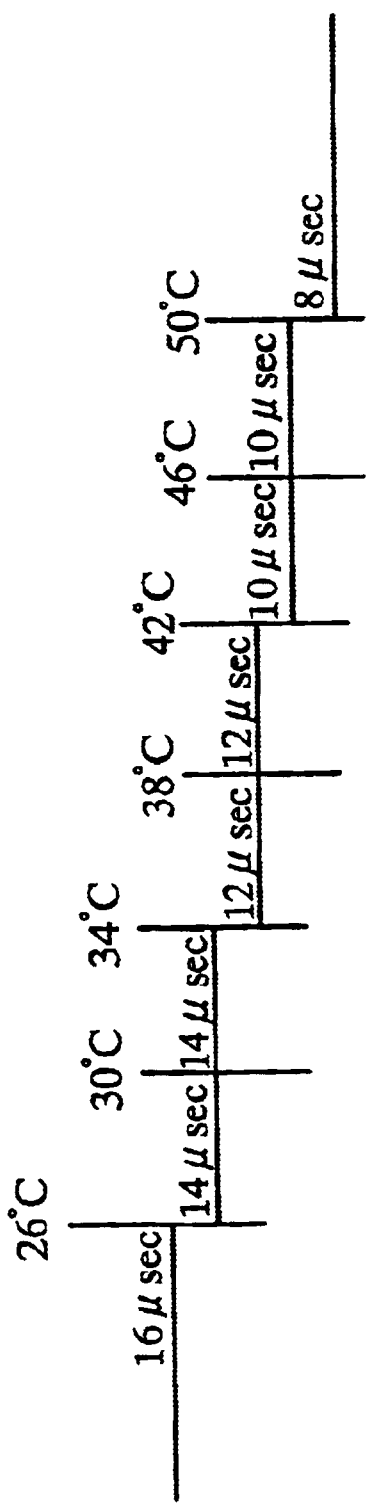
FIG. 12 shows an example of regulating an amount of light emission in accordance with the temperature.
Figure 13:
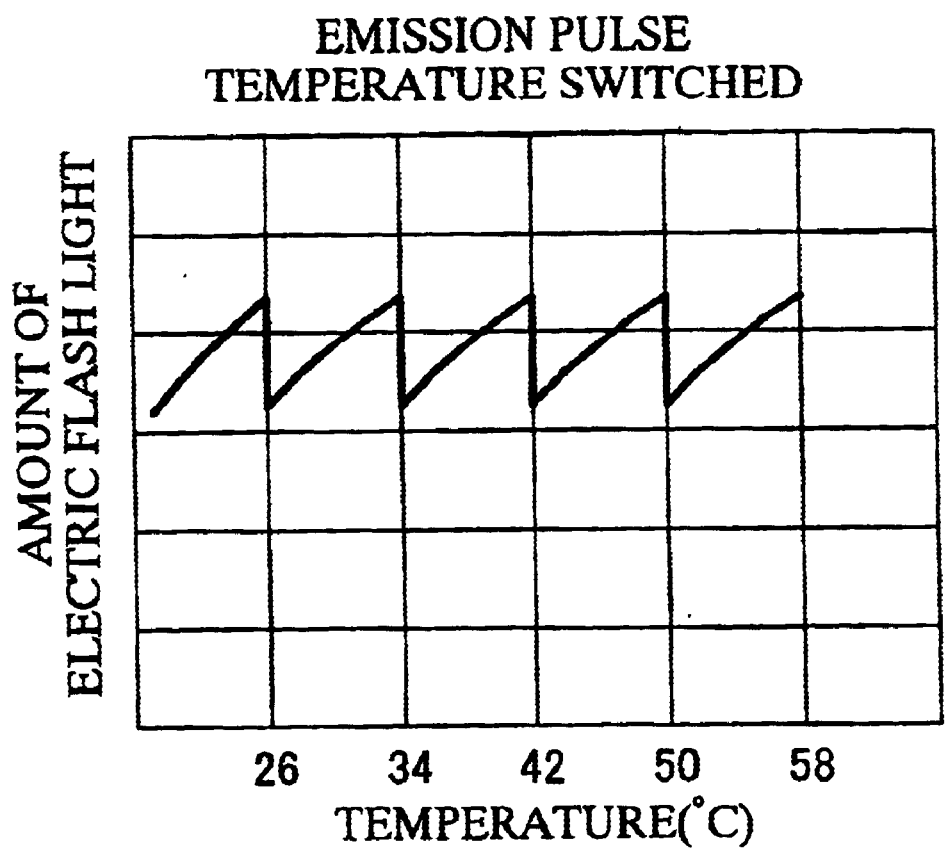
FIG. 13 is a graph showing a temperature-independence of an amount of electric flash light.

Further, in view of the fact that the higher the temperature the greater the amount of light emission if the duration of light emission is fixed on account of the temperature characteristic (tangent delta characteristic) of the main capacitor MC, the CPU 60 alters the duration of light emission in the first pre-emission according to the ambient temperature (the temperature within the camera). Thus, the higher the ambient temperature is, the shorter the duration of light emission is. Incidentally, a temperature sensor is built into the camera to measure the temperature within, and the CPU 60 can measure the temperature within the camera with this temperature sensor. FIG. 12 shows an example of regulating the duration of light emission in accordance with the temperature. As shown in FIG. 12, the temperature range is divided into four-degree segments. The duration is set to 16 $\mu$s up to 26 degrees Celsius, 14 $\mu$s between 26 and 34 degrees Celsius, 12 $\mu$s between 34 and 42 degrees Celsius, 10 $\mu$s between 42 and 50 degrees Celsius, and 8 $\mu$s beyond 50 degrees Celsius. This makes the luminous energy emitted from the electric flash substantially constant irrespective of the temperature as shown in FIG. 13.

When this first pre-emission brings the integral of any cell within the peak selection region to the end-of-integration value as shown in FIG. 11(B), pre-emission is ended. On the other hand, if the integral does not reach the end-of-integration value as shown in FIGS. 11(C) to 11(E), the lapse of a light emission interval of 25 ms is awaited after the first pre-emission. If the integral reaches the end-of-integration value during this period, the integration is ended. If the integral fails to reach the end-of-integration value in 25 ms after the first pre-emission, the second pre-emission is performed. The second pre-emission is greater in the amount of light emission than the first, and the duration of emission is 28 $\mu$s. If this second pre-emission brings the integral to the end-of-integration value as shown in FIG. 11(C), pre-emission is ended. On the other hand, if the integral does not reach the end-of-integration value as shown in FIGS. 11(D) to 11(E), pre-emission of 28 $\mu$s in duration will be repeated after the lapse of 25 ms as in the second pre-emission until the integral reaches the end-of-integration value. However, if pre-emission reaches the predetermined maximum number of times, the integration is ended when pre-emission ends even if the integral has not reached the end-of-integration value. Incidentally, FIG. 11(D) shows a case in which pre-emission is performed three times, and FIG. 11(E), a case in which pre-emission is performed four times.

Figure 14:
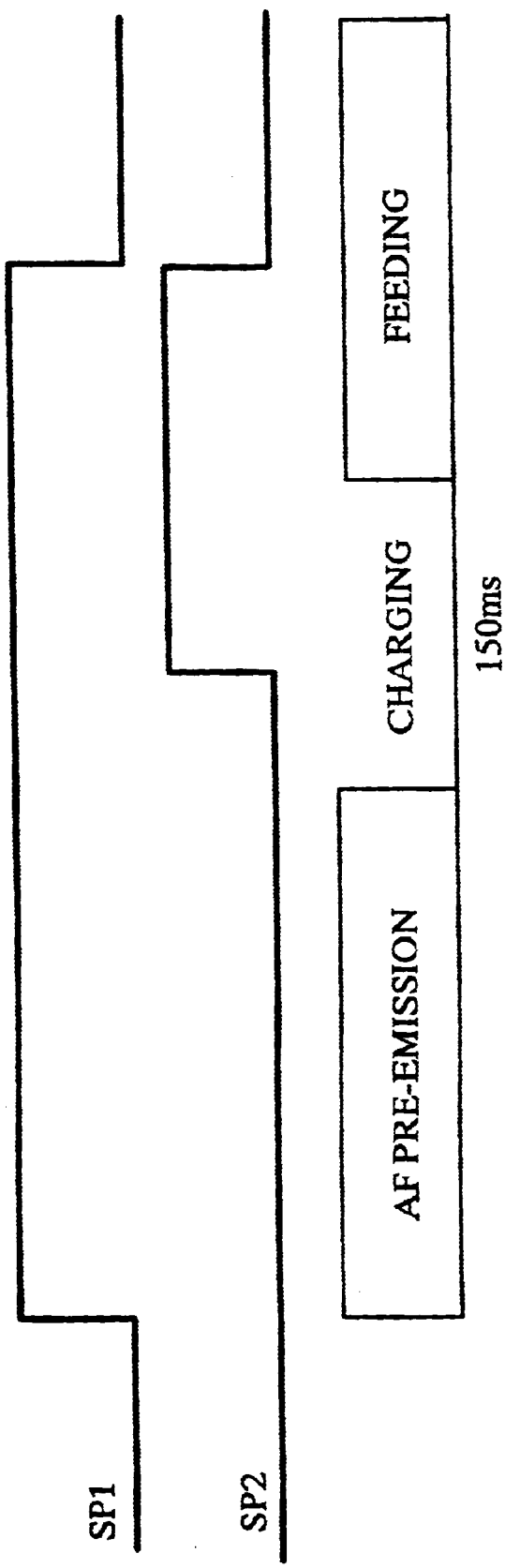
FIG. 14 illustrates processing to charge an electric flash (charging of a main capacitor MC) in connection with pre-emission.

Next will be described processing of electric flash charging (charging of the main capacitor MC) in connection with pre-emission. As shown in FIG. 14, when the shutter release button 34 is half pressed and SP1 is turned ON (H level), the CPU 60 performs pre-emission as described above. Then, if the ending conditions of pre-emission are met and the pre-emission end, it charges the electric flash. Thus, a pulse train signal is entered from the FCP signal line shown in FIG. 9. If the shutter release button 34 is fully pressed and SP2 is turned ON (H level) while the electric flash is being charged, the CPU 60 secures a charging duration of at least 150 ms to ensure that the minimum required charge is available for the real emission at the time the shutter is released, and then stops charging the electric flash and allows the shutter to be released.

Figure 15:
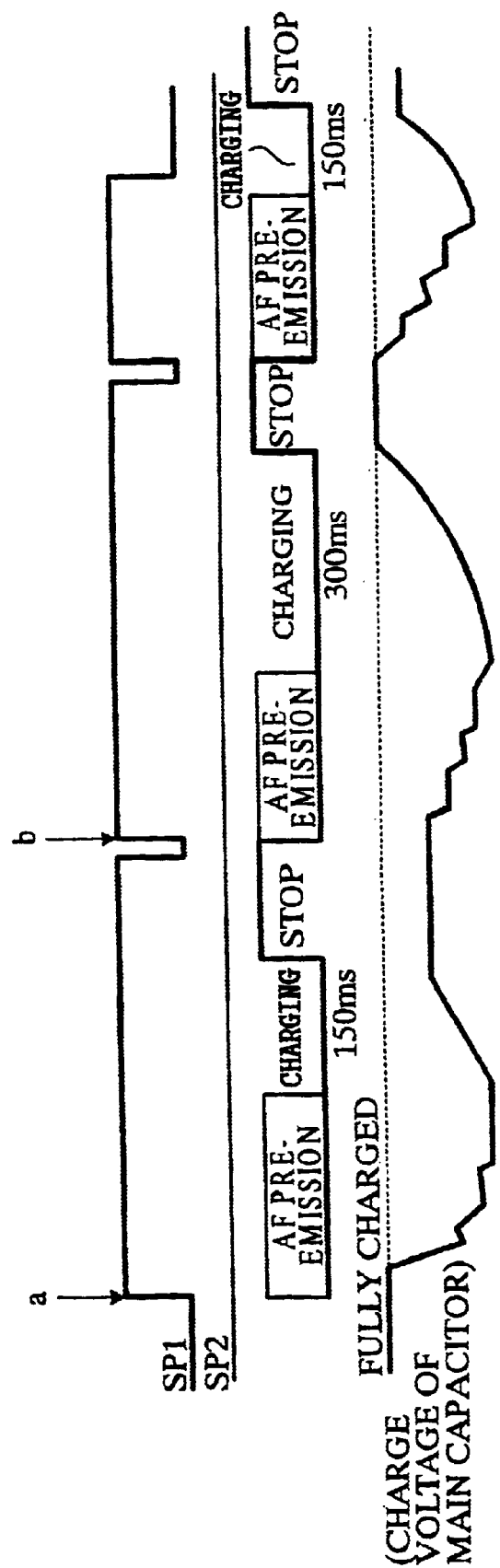
FIG. 15 further illustrates processing to charge the electric flash (charging of the main capacitor MC) in connection with pre-emission.

On the other hand, if the shutter release button 34 is not fully pressed but half-pressing and cancellation take place consecutively, and pre-emission is performed in a state wherein the main capacitor MC is fully charged as at the time of half pressing indicated by a in FIG. 15, the capacitor is charged only for 150 ms after the end of pre-emission. Thus, the charging is stopped even if the main capacitor MC is not fully charged, but the minimum required charge (permissible minimum) for the real emission (electric flash shooting) at time of releasing the shutter is secured. This can prevent the shutter release from being long delayed even if the shutter release button 34 is fully pressed after pre-emission, and the photographer would feel nothing awkward.

Unlike in this case, if pre-emission is performed in a state in which the main capacitor MC is not fully charged as at the time of half pressing as represented by b in FIG. 15, the capacitor is charged for 300 ms after the end of pre-emission.

To add, if the charging after pre-emission does not fully charge the main capacitor MC, the charging is resumed when half pressing is cancelled.

Figure 16:
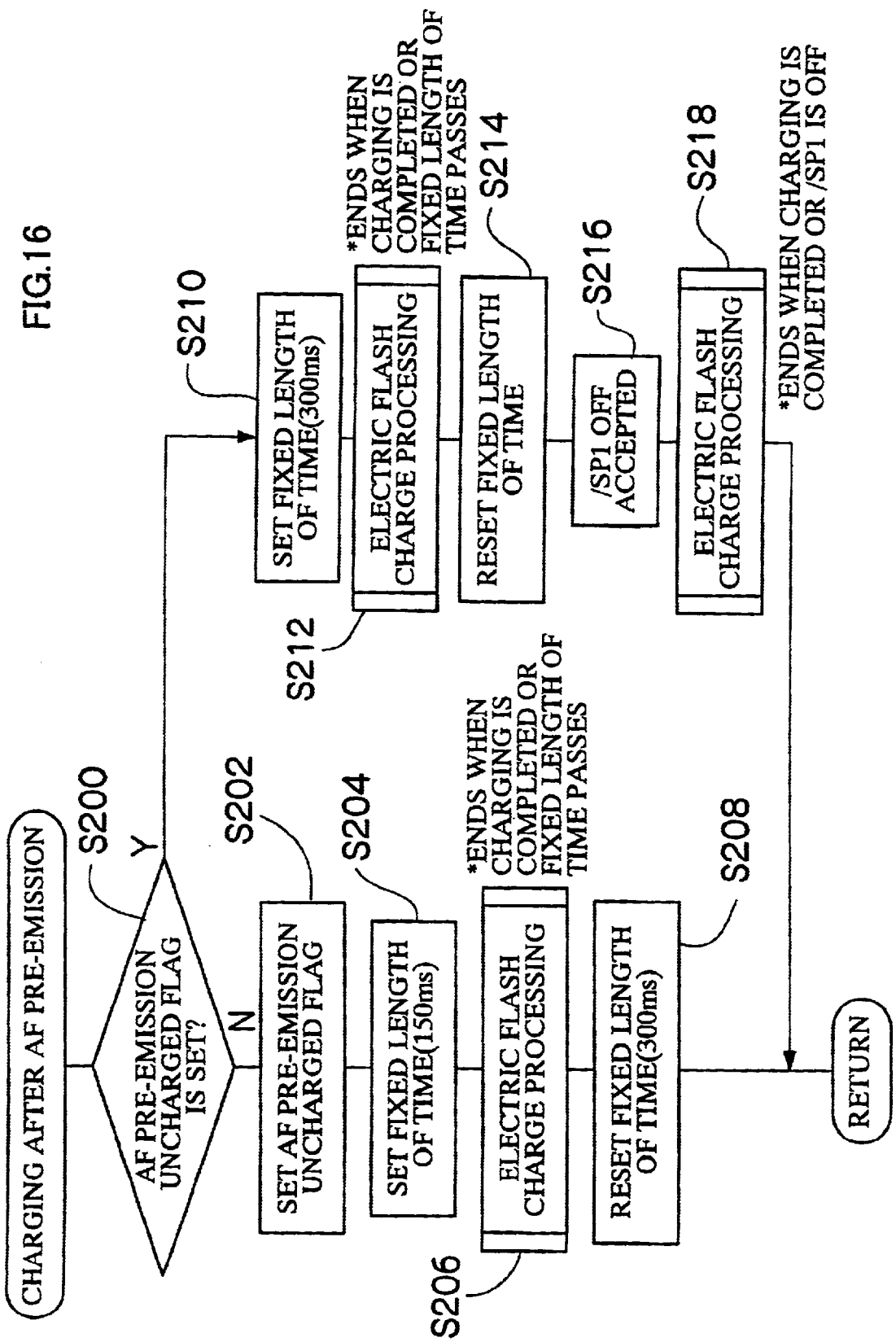
FIG. 16 is a flow chart showing a procedure of charge processing by a CPU after pre-emission.

FIG. 16 is a flow chart showing the procedure of charge processing by the CPU 60 after pre-emission. First, the CPU 60 judges whether or not an AF pre-emission uncharged flag is set (step S200). If it is NO, the CPU 60 sets the AF pre-emission uncharged flag (step S202), and keeps it set for a fixed duration (150 ms) (step S204). Then it executes electric flash charge processing (step S206). The electric flash charge processing is ended when the charging is completed or a fixed length of time has passed. If the charging is completed, the CPU 60 resets an AF pre-emission uncharged flag. Then it resets a fixed length of time (step S208) to end the processing shown in this flow chart.

On the other hand, if the judgment is YES at step the above-described S200, it is kept set for a fixed length of time (300 ms) (step S210). Then, electric flash charge processing is executed (step S212). As described above, the electric flash charge processing is ended when the charging is completed or the fixed length of time has passed. If the charging is completed, the CPU 60 resets the AF pre-emission uncharged flag. Then it resets the fixed length of time (step S214), and accepts an SP1 OFF signal (step S216). If electric flash charging has not ended, electric flash charge processing is resumed (step S218). This electric flash charge processing is ended when the charging is completed or at an SP1 OFF signal. Upon completion of the processing at step S218, the whole processing shown in this flow chart ends.

Although the foregoing description supposes that charging is performed for 300 ms whenever pre-emission is performed in a less than fully charged state (if full charging is achieved within 300 ms, the charging is ended then), it is also acceptable to alternate 300 ms charging and 150 ms charging if pre-emission is consecutively done in a less than fully charged state. Thus, supposing that the charging after pre-emission in a fully charge state is the first charge, and the subsequent charges after pre-emission are counted as the second, third and so forth, it may be acceptable to continue charging for 150 ms in any odd-number and for 300 ms in any even-numbered round.

Next will be described processing of electric flash charging (charging of the main capacitor MC) in connection with pre-emission with reference to another embodiment of the invention (a second embodiment).

Figure 17:
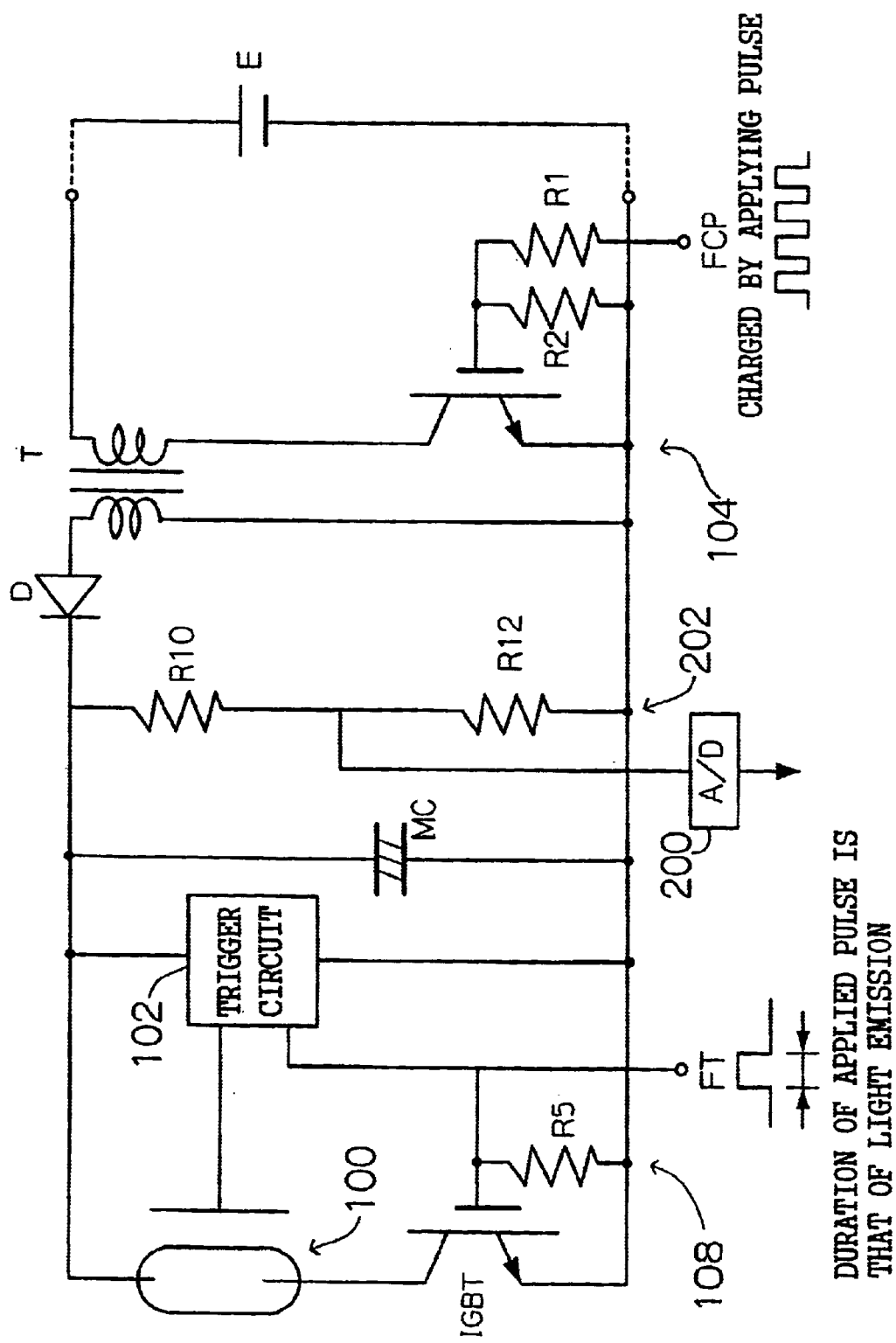
FIG. 17 is a circuit diagram showing a configuration of an electric flash circuit in a second embodiment according to the invention.

FIG. 17 is a circuit diagram showing the configuration of an electric flash circuit in the second embodiment of the invention. Circuit elements either the same as or similar to their respective counterparts in the electric flash circuit shown in FIG. 9 are assigned respectively the same reference signs as in FIG. 9, and their description is dispensed with. In the electric flash circuit shown in FIG. 17, in place of the charge completion detecting circuit 106 in FIG. 9, there is provided a charging voltage detecting circuit 202 configured by resistors R10 and R12 and an A/D converter 200 connected in parallel to the main capacitor MC. This charging voltage detecting circuit 202 is intended for detecting the charge voltage of the main capacitor MC. The charge voltage of the main capacitor MC is divided by the resistors R10 and R12 into voltages readable by the CPU 60, and the divided voltages are converted by the A/D converter 200 into digital signals, which are provided to the CPU 60.

Next will be described the processing of electric flash charging in connection with pre-emission in the second embodiment of the invention. As stated above, the CPU 60 performs pre-emission when SP1 is turned ON and, if the ending conditions of pre-emission are met and the pre-emission ends, it charges the electric flash. Thus, a pulse train signal is entered from the FCP signal line shown in FIG. 9. If the shutter release button 34 is fully pressed and SP2 is turned ON while the electric flash is being charged, the CPU 60, after charging the electric flash to the minimum required charge (charging voltage) for the real emission at the time the shutter is released, then stops charging the electric flash and allows the shutter to be released.

On the other hand, if the shutter release button 34 is not fully pressed but half pressing and cancellation take place consecutively, and pre-emission is performed in a state wherein the main capacitor MC is fully charged as at the time of half pressing indicated by a in FIG. 15, the capacitor is charged until the A/D value obtained from the A/D converter 200 in FIG. 17 comes to a voltage that indicates that the charging voltage of the main capacitor MC has reached, for instance, 270 V. Thus, even if the main capacitor MC is not fully charged, the charging is stopped after securing the minimum required charge (permissible minimum) for the real emission (electric flash shooting) at the time of releasing the shutter. This can prevent the shutter release from being long delayed even if the shutter release button 34 is fully pressed after pre-emission, and the photographer would feel nothing awkward.

Unlike in this case, if pre-emission is performed in a state in which the main capacitor MC is not fully charged as at the time of half pressing as represented by b in FIG. 15, the capacitor is charged until the A/D value obtained from the A/D converter 200 in FIG. 17 comes to a voltage that indicates that the charging voltage of the main capacitor MC has reached a state of full charging (for instance 300 V).

To add, if the charging after pre-emission after the state of full charging does not fully charge the main capacitor MC, the charging is resumed when half pressing is cancelled.

FIG. 18 is a flow chart showing the procedure of charge processing by the CPU 60 after pre-emission in the second embodiment of the invention. First, the CPU 60 judges whether or not an AF pre-emission uncharged flag is set (step S300). If it is not, the CPU 60 sets the AF pre-emission uncharged flag (step S302), and sets a charge end voltage of 270 V (step S304). Then it executes electric flash charge processing (step S306). The electric flash charge processing is ended when the main capacitor MC reaches the charge end voltage of 270 V. Then it resets the charge end voltage (step S308) to end the processing shown in this flow chart.

On the other hand, if the flag is found set at step S300 above, a charge end voltage of 300 V is set (step S310). Then, electric flash charge processing is executed (step S312). This electric flash charge processing is ended when the main capacitor MC reaches the charge end voltage of 300 V. Or if the charging is completed, the CPU 60 resets the AF pre-emission uncharged flag. Then it resets the charge end voltage (step S314), and accepts an SP1 OFF signal (step S316). Upon completion of the processing at step S316, the whole processing shown in this flow chart ends.

Though the above-described embodiments concern a camera using a silver halide film, the invention is not limited to this, but can as well be effectively applied to cameras which record images on other kinds of recording medium, including a digital camera.

Furthermore, though the above-described embodiments refer to the use of a pair of line sensors for passive auto-focusing and assessing the subject distance from the amount of lag between the subject images of each sensor, the invention is not limited to this, but it is also applicable to a camera which carries out auto-focusing control by the so-called contrast method.

As hitherto described, in this camera according to the present invention, since the main capacitor is not always fully charged after an auxiliary light for auto-focusing use is emitted by half pressing the shutter release button, but it is charged only for a limited length of time or a limited charging voltage, the operating convenience can be prevented from being deteriorated by charging. Also, by setting that duration of charging to a required length of time or a required charging voltage for charging the main capacitor to a permissible minimum level to make possible electric flash shooting, impossibility of electric flash shooting due to insufficient charging can be reliably prevented. Furthermore, by differentiating the length of time for charging according to whether or not the main capacitor is fully charged before auxiliary light emission, a more satisfactory performance can be achieved. Thus, since the remaining capacitance of the capacitor presumably is smaller after auxiliary light emission in a state in which it is not fully charged than after auxiliary light emission in a fully charged state, rational charging can be processed by charging the capacitor for a shorter period of time in the former case than in the latter case.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera, comprising:
  a sensor having a plurality of light receiving elements which receive light from a subject in a range-finding area;
  an auto-focusing controller which performs auto-focusing control according to an output of the sensor;
  a charging device which charges a main capacitor;
  a light emitting device which is supplied with electric energy by the main capacitor and emits auxiliary light for auto-focusing use and auxiliary light for exposure use to the subject;
  a shutter release button which, when half pressed, causes auto-focusing control to be started according to the output of the sensor and, when fully pressed, causes shooting to be started;
  a light emission control device which causes the light emitting device to emit the auxiliary light for auto-focusing use when the shutter release button is half pressed and a desired output value is not obtained from the sensor; and
  a control device which, the auxiliary light for auto-focusing use emitted from the light emitting device in a state where the main capacitor is fully charged being supposed to be a first auxiliary light and the auxiliary light for auto-focusing use later emitted from the light emitting device when the shutter release button is half pressed again in a state where the main capacitor is not fully charged being supposed to be a second auxiliary light, following the emission of the first auxiliary light from the light emitting device, permits electric flash shooting by fully pressing the shutter release button after the charging of the main capacitor by the charging device as long as a first length of time and, following the emission of the second auxiliary light from the light emitting device, permits electric flash shooting by fully pressing the shutter release button after the charging of the main capacitor by the charging device as long as a second length of time longer than the first length of time.

2. The camera as set forth in claim 1, wherein the first length of time is a length of time required for enabling the charging device to charge the main capacitor to a permissible minimum level to make possible electric flash shooting.

3. The camera as set forth in claim 1, wherein the control device, following the emission of the auxiliary light of an odd-numbered round from the light emitting device, permits electric flash shooting by fully pressing the shutter release button after the charging of the main capacitor by the charging device as long as the first length of time and, following the emission of the auxiliary light of an even-numbered round from the light emitting device, permits electric flash shooting by fully pressing the shutter release button after the charging of the main capacitor by the charging device as long as the second length of time.

4. The camera as set forth in claim 3, wherein the first length of time is a length of time required for enabling the charging device to charge the main capacitor to a permissible minimum level to make possible electric flash shooting.

5. A camera, comprising:
   a sensor having a plurality of light receiving elements which receive light from a subject in a range-finding area;
   an auto-focusing controller which performs auto-focusing control according to an output of the sensor;
   a charging device which charges a main capacitor;
   a light emitting device which is supplied with electric energy by the main capacitor and emits auxiliary light for auto-focusing use and auxiliary light for exposure use to the subject;
   a shutter release button which, when half pressed, causes auto-focusing control to be started according to the output of the sensor and, when fully pressed, causes shooting to be started;
   a light emission control device which causes the light emitting device to emit the auxiliary light for auto-focusing use when the shutter release button is half pressed and a desired output value is not obtained from the sensor; and
   a control device which, the auxiliary light for auto-focusing use emitted from the light emitting device in a state where the main capacitor is fully charged being supposed to be a first auxiliary light and the auxiliary light for auto-focusing use later emitted from the light emitting device when the shutter release button is half pressed again in a state where the main capacitor is not fully charged being supposed to be a second auxiliary light, following the emission of the first auxiliary light from the light emitting device, permits electric flash shooting by fully pressing the shutter release button after the charging of the main capacitor by the charging device to a permissible minimum level to make possible electric flash shooting and, following the emission of the second auxiliary light from the light emitting device, permits electric flash shooting by fully pressing the shutter release button after the charging of the main capacitor by the charging device to a fully charged level.

* * * * *